US011993079B2

(12) United States Patent
Orihara et al.

(10) Patent No.: US 11,993,079 B2
(45) Date of Patent: May 28, 2024

(54) LIQUID EJECTING APPARATUS

(71) Applicant: SEIKO EPSON CORPORATION, Tokyo (JP)

(72) Inventors: Daichi Orihara, Nagano (JP); Masashi Kamiyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 17/656,043

(22) Filed: Mar. 23, 2022

(65) Prior Publication Data

US 2022/0305770 A1 Sep. 29, 2022

(30) Foreign Application Priority Data

Mar. 25, 2021 (JP) ................................ 2021-051762

(51) Int. Cl.
*B41J 2/045* (2006.01)
*B41J 2/165* (2006.01)
*B41J 2/21* (2006.01)

(52) U.S. Cl.
CPC ......... *B41J 2/0451* (2013.01); *B41J 2/04563* (2013.01); *B41J 2/04581* (2013.01)

(58) Field of Classification Search
CPC ...................................................... B41J 2/0451
See application file for complete search history.

(56) References Cited

U.S. PATENT DOCUMENTS

2007/0070108 A1* 3/2007 Mantell .................. B41J 2/2146 347/19
2011/0115841 A1* 5/2011 Ito ........................ B41J 2/16579 347/14
2014/0009529 A1* 1/2014 Teshigawara .......... B41J 2/2146 347/23
2015/0097885 A1* 4/2015 Hosokawa ........... B41J 2/04581 347/10

FOREIGN PATENT DOCUMENTS

JP 2011-104803 A 6/2011

* cited by examiner

*Primary Examiner* — Shelby L Fidler
(74) *Attorney, Agent, or Firm* — Global IP Counselors, LLP

(57) ABSTRACT

A liquid ejecting apparatus includes: an ejection section ejecting a liquid; a state detection section detecting a state of the ejection section; a determination section determining whether or not the ejection section has an abnormality; a recording section recording a determination result of the determination section; a temperature detection section detecting a temperature of the ejection section; and a maintenance section executing maintenance processing on the ejection section, in which when the recording section records abnormality information indicating the abnormality of the ejection section as the determination result by determining that the abnormality occurred in the ejection section by the determination section, and the temperature detection section detects a temperature that is out of an inspection temperature range in which the state detection section (Continued)

| RECORDING INFORMATION BEFORE PERFORMING EVENT | EVENT | | RECORDING INFORMATION AFTER PERFORMING EVENT |
|---|---|---|---|
| | STATE DETECTION OF EJECTION SECTION | MAINTENANCE PROCESSING | |
| NORMAL NOZZLE | NORMAL DETECTION | — | NORMAL NOZZLE |
| | ABNORMAL DETECTION | — | ABNORMAL NOZZLE |
| | — | PROCESSING EXECUTION | NORMAL NOZZLE |
| ABNORMAL NOZZLE | NORMAL DETECTION | — | NORMAL NOZZLE |
| | ABNORMAL DETECTION | — | ABNORMAL NOZZLE |
| | — | PROCESSING EXECUTION | NOZZLE SUBJECTED TO RECOVERY PROCESSING |
| NOZZLE SUBJECTED TO RECOVERY PROCESSING | NORMAL DETECTION | — | NORMAL NOZZLE |
| | ABNORMAL DETECTION | — | FAILED NOZZLE |
| | — | PROCESSING EXECUTION | NOZZLE SUBJECTED TO RECOVERY PROCESSING |
| FAILED NOZZLE | NORMAL DETECTION | — | NORMAL NOZZLE |
| | ABNORMAL DETECTION | — | FAILED NOZZLE |
| | — | PROCESSING EXECUTION | FAILED NOZZLE |

| RECORDING INFORMATION BEFORE PERFORMING EVENT | EVENT | | RECORDING INFORMATION AFTER PERFORMING EVENT |
|---|---|---|---|
| | STATE DETECTION OF EJECTION SECTION | MAINTENANCE PROCESSING | |
| NORMAL NOZZLE | NORMAL DETECTION | — | NORMAL NOZZLE |
| | ABNORMAL DETECTION | — | NORMAL NOZZLE |
| | — | PROCESSING EXECUTION | NORMAL NOZZLE |
| ABNORMAL NOZZLE | NORMAL DETECTION | — | ABNORMAL NOZZLE |
| | ABNORMAL DETECTION | — | ABNORMAL NOZZLE |
| | — | PROCESSING EXECUTION | NORMAL NOZZLE |
| NOZZLE SUBJECTED TO RECOVERY PROCESSING | NORMAL DETECTION | — | NOZZLE SUBJECTED TO RECOVERY PROCESSING |
| | ABNORMAL DETECTION | — | NOZZLE SUBJECTED TO RECOVERY PROCESSING |
| | — | PROCESSING EXECUTION | NORMAL NOZZLE |
| FAILED NOZZLE | NORMAL DETECTION | — | FAILED NOZZLE |
| | ABNORMAL DETECTION | — | FAILED NOZZLE |
| | — | PROCESSING EXECUTION | FAILED NOZZLE |

detects the state of the ejection section, the abnormality information recorded in the recording section is reset if the maintenance section executes the maintenance processing.

7 Claims, 16 Drawing Sheets

FIG. 6

| SI (b1, b2, b3) | Ts1 | | | Ts2 | | |
|---|---|---|---|---|---|---|
| | Sa | Sb | Sc | Sa | Sb | Sc |
| (1, 1, 0) | H | L | L | H | L | L |
| (1, 0, 0) | H | L | L | L | H | L |
| (0, 1, 0) | L | H | L | H | L | L |
| (0, 0, 0) | L | H | L | L | H | L |
| (0, 0, 1) | L | L | H | L | L | H |

FIG. 20

| RECORDING INFORMATION BEFORE PERFORMING EVENT | EVENT | | RECORDING INFORMATION AFTER PERFORMING EVENT |
|---|---|---|---|
| | STATE DETECTION OF EJECTION SECTION | MAINTENANCE PROCESSING | |
| NORMAL NOZZLE | NORMAL DETECTION | — | NORMAL NOZZLE |
| | ABNORMAL DETECTION | — | ABNORMAL NOZZLE |
| | — | PROCESSING EXECUTION | NORMAL NOZZLE |
| ABNORMAL NOZZLE | NORMAL DETECTION | — | NORMAL NOZZLE |
| | ABNORMAL DETECTION | — | ABNORMAL NOZZLE |
| | — | PROCESSING EXECUTION | NOZZLE SUBJECTED TO RECOVERY PROCESSING |
| NOZZLE SUBJECTED TO RECOVERY PROCESSING | NORMAL DETECTION | — | NORMAL NOZZLE |
| | ABNORMAL DETECTION | — | FAILED NOZZLE |
| | — | PROCESSING EXECUTION | NOZZLE SUBJECTED TO RECOVERY PROCESSING |
| FAILED NOZZLE | NORMAL DETECTION | — | NORMAL NOZZLE |
| | ABNORMAL DETECTION | — | FAILED NOZZLE |
| | — | PROCESSING EXECUTION | FAILED NOZZLE |

FIG. 21

| RECORDING INFORMATION BEFORE PERFORMING EVENT | EVENT | | RECORDING INFORMATION AFTER PERFORMING EVENT |
|---|---|---|---|
| | STATE DETECTION OF EJECTION SECTION | MAINTENANCE PROCESSING | |
| NORMAL NOZZLE | NORMAL DETECTION | — | NORMAL NOZZLE |
| | ABNORMAL DETECTION | — | NORMAL NOZZLE |
| | — | PROCESSING EXECUTION | NORMAL NOZZLE |
| ABNORMAL NOZZLE | NORMAL DETECTION | — | ABNORMAL NOZZLE |
| | ABNORMAL DETECTION | — | ABNORMAL NOZZLE |
| | — | PROCESSING EXECUTION | NORMAL NOZZLE |
| NOZZLE SUBJECTED TO RECOVERY PROCESSING | NORMAL DETECTION | — | NOZZLE SUBJECTED TO RECOVERY PROCESSING |
| | ABNORMAL DETECTION | — | NOZZLE SUBJECTED TO RECOVERY PROCESSING |
| | — | PROCESSING EXECUTION | NORMAL NOZZLE |
| FAILED NOZZLE | NORMAL DETECTION | — | FAILED NOZZLE |
| | ABNORMAL DETECTION | — | FAILED NOZZLE |
| | — | PROCESSING EXECUTION | FAILED NOZZLE |

LIQUID EJECTING APPARATUS

The present application is based on, and claims priority from JP Application Serial Number 2021-051762, filed Mar. 25, 2021, the disclosure of which is hereby incorporated by reference herein in its entirety.

BACKGROUND

1. Technical Field

The present disclosure relates to a liquid ejecting apparatus.

2. Related Art

In a liquid ejecting apparatus such as an ink jet printer, a driving element, such as a piezoelectric element, is driven by a drive signal to eject ink from an ejection section as a liquid filled in a print head, and the ink is landed on a medium, thereby forming a desired image on the medium. In such a liquid ejecting apparatus, when an abnormality occurs in the ejection section that ejects ink, a so-called ejection abnormality in which the ink cannot be ejected normally occurs. Such an ejection abnormality may deteriorate the quality of the image formed on the medium by the liquid ejecting apparatus.

In connection with the deterioration of the image quality caused by the ejection abnormality, JP-A-2011-104803 discloses a printer (liquid ejecting apparatus) including a technology of detecting whether or not an ejection section has an abnormality. The printer realizes control of both proper inspection on the nozzle and liquid ejection by ejecting ink from the ejection section and simultaneously executing inspection of whether or not the nozzle included in the ejection section is normal when a temperature of a head having a plurality of nozzles for ejecting a liquid is detected and the detected temperature is within a first temperature range, and by ejecting the ink from the ejection section and simultaneously executing no inspection of whether or not the nozzle included in the ejection section is normal when the detected temperature is out of the first temperature range and within a second temperature range.

However, in the liquid ejecting apparatus disclosed in JP-A-2011-104803, the inspection whether or not the ejection section is normal is not executed when the head is out of the first temperature range (inspection temperature range). Thus, even when a state of the ejection section in which the abnormality has occurred outside the inspection temperature range is recovered, the ejection section is continuously determined to be abnormal, and an ejection operation of the liquid is continued. Therefore, the image quality formed on the medium may deteriorate.

SUMMARY

According to an aspect of the present disclosure, there is provided a liquid ejecting apparatus including: an ejection section ejecting a liquid; a state detection section detecting a state of the ejection section; a determination section determining whether or not the ejection section has an abnormality based on a detection result of the state detection section; a recording section recording a determination result of the determination section; a temperature detection section detecting a temperature of the ejection section; and a maintenance section executing maintenance processing on the ejection section, in which when the recording section records abnormality information indicating the abnormality of the ejection section as the determination result by determining that the abnormality occurred in the ejection section by the determination section, and the temperature detection section detects a temperature that is out of an inspection temperature range in which the state detection section detects the state of the ejection section, the abnormality information recorded in the recording section is reset if the maintenance section executes the maintenance processing.

BRIEF DESCRIPTION OF THE DRAWINGS

FIG. 6 is a diagram illustrating an example of contents of decoding performed by a decoder.

FIG. 20 is a diagram illustrating an example of update conditions of ejection section state information when a temperature is within an inspection temperature range based on a temperature information signal.

FIG. 21 is a diagram illustrating an example of the update conditions of the ejection section state information when the temperature is out of the inspection temperature range based on the temperature information signal.

DESCRIPTION OF EXEMPLARY EMBODIMENTS

Figure 1:
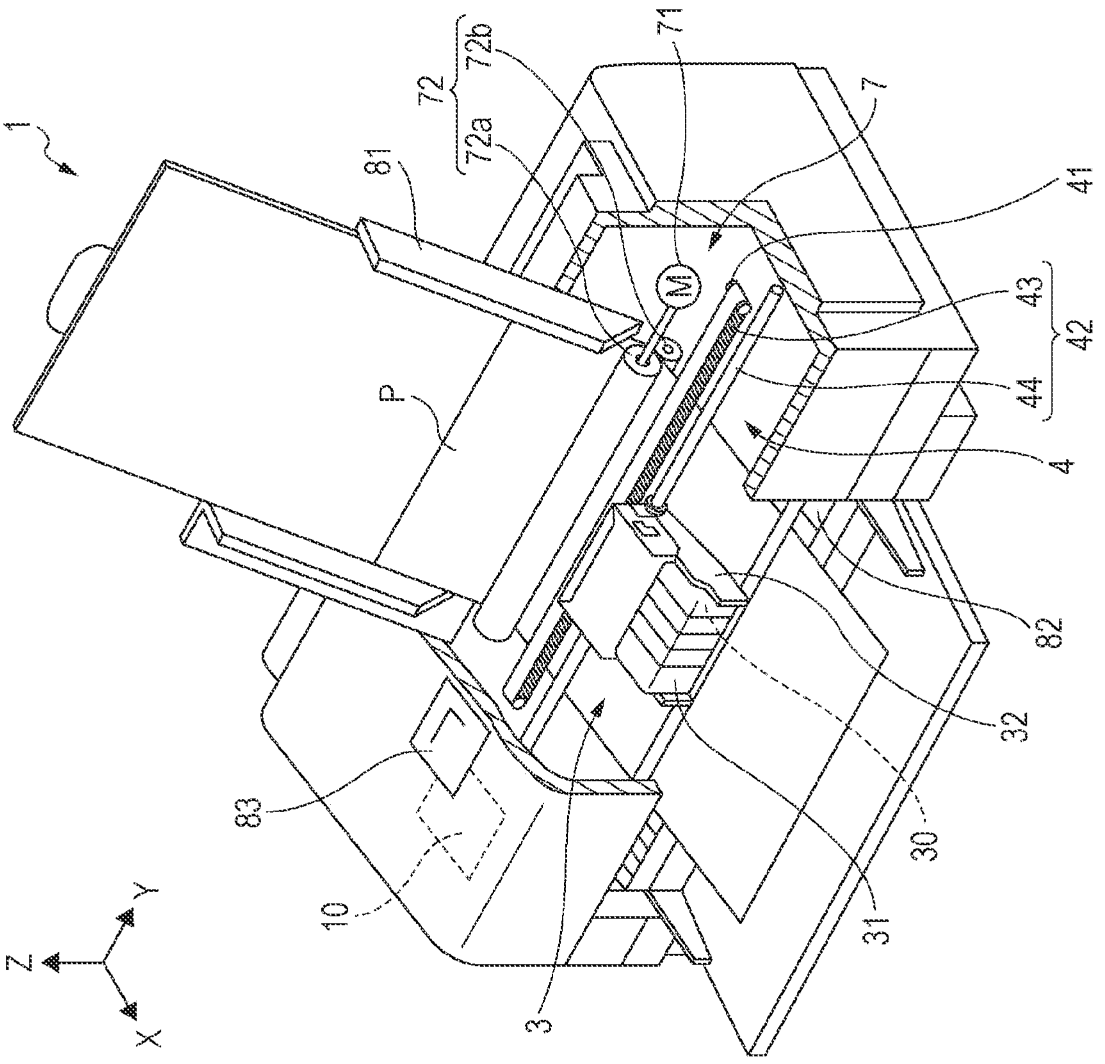
FIG. 1 is a view illustrating a schematic structure of a liquid ejecting apparatus.

Hereinafter, preferred embodiments of the present disclosure will be described with reference to drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Structure of Liquid Ejecting Apparatus

An example of a structure of a liquid ejecting apparatus 1 will be described. FIG. 1 is a view illustrating a schematic structure of the liquid ejecting apparatus 1. FIG. 1 illustrates X, Y, and Z directions that are orthogonal to each other. In the following description, an upper side corresponding to a +Z direction in FIG. 1 may be referred to as an "upper part", and a lower side corresponding to a −Z direction may be referred to as a "lower part".

As illustrated in FIG. 1, the liquid ejecting apparatus 1 includes a printing section 4, a paper feeding section 7, a tray 81, a paper discharge port 82, an operation panel 83, and a control unit 10.

The tray 81 is located on an upper rear part of the liquid ejecting apparatus 1, and a medium P on which an image is formed is mounted on the tray 81. The paper discharge port 82 is located on a lower front part of the liquid ejecting apparatus 1, and the medium P on which the image is formed is discharged from the paper discharge port 82. The operation panel 83 is located on an upper surface of the liquid ejecting apparatus 1, and includes a display section (not illustrated) displaying an error message or the like, and an operation section (not illustrated) including various switches by which operation information is input. The operation panel 83 inputs the operation information by a user and notifies the user of the operation information of the liquid ejecting apparatus 1. Here, the display section included in the operation panel 83 may be, for example, a liquid crystal display, an organic EL display, an LED lamp, or the like, and the operation panel 83 may be a so-called touch panel in which the display section and the operation section are integrated.

The printing section 4 includes a moving object 3, a carriage motor 41, and a reciprocating mechanism 42.

The moving object 3 includes a head unit 30, a plurality of ink cartridges 31, and a carriage 32. Each of the plurality of ink cartridges 31 is filled with inks corresponding to inks having colors such as yellow, cyan, magenta, and black. The ink filled in the ink cartridge 31 is supplied to the head unit 30. The head unit 30 has a plurality of print heads 35, which will be described later. The ink supplied from the ink cartridge 31 is supplied to the plurality of print heads 35. As a result, the ink is filled in the print head 35. The print head 35 is driven to eject the ink filled in the print head 35. The plurality of ink cartridges 31 and the head unit 30 are installed in the carriage 32.

The carriage motor 41 functions as a drive source for reciprocating the carriage 32 in which the plurality of ink cartridges 31 and the head unit 30 are installed along the Y direction, which is a main scanning direction. Further, the reciprocating mechanism 42 has a carriage guide shaft 44 whose both ends are supported by a frame (not illustrated), and a timing belt 43 extending in parallel with the carriage guide shaft 44. The carriage 32 is reciprocally supported by the carriage guide shaft 44, and is fixed to a part of the timing belt 43. Then, the timing belt 43 travels in forward and reverse directions in response to an operation of the carriage motor 41, so that the carriage 32 fixed to a part of the timing belt 43 reciprocates by being guided by the carriage guide shaft 44.

In the printing section 4 configured as described above, the carriage 32 included in the moving object 3 reciprocates along the main scanning direction by the operation of the carriage motor 41 and the reciprocating mechanism 42, and is synchronized with the reciprocation of the carriage 32, the head unit 30 installed in the carriage 32 thus ejects the ink to the medium P. As a result, the printing section 4 can eject the ink over the entire width direction of the medium P, which is a direction along the main scanning direction of the medium P. FIG. 1 illustrates a case where the ink cartridge 31 is installed in the carriage 32, but the present disclosure is not limited thereto.

The paper feeding section 7 supplies the medium P mounted on the tray 81 to the printing section 4, and carries out the medium P on which the ink has been landed in the printing section 4 from the paper discharge port 82. That is, the paper feeding section 7 controls transport of the medium P.

The paper feeding section 7 includes a paper feeding motor 71 as a drive source and a paper feeding roller 72 that is rotated by an operation of the paper feeding motor 71. The paper feeding roller 72 includes a drive roller **72*a* coupled to the paper feeding motor 71 and a driven roller 72*b* located so as to face the drive roller 72*a* with the medium P interposed between the drive roller 72*a* and the driven roller 72*b* in a transport path of the medium P. The paper feeding roller 72 feeds the media P mounted on the tray 81 one by one toward the printing section 4, and the medium P to which the ink is ejected in the printing section 4 is discharged one by one toward the paper discharge port 82. The liquid ejecting apparatus 1 may include a paper feeding cassette for accommodating the medium P in place of or in addition to the tray 81**.

The control unit 10 controls each portion of the liquid ejecting apparatus 1 including the printing section 4 and the paper feeding section 7.

Specifically, the control unit 10 controls the paper feeding section 7 to control the transport of the medium P in a sub-scanning direction. In addition, the control unit 10 controls the carriage motor 41 to reciprocate the moving object 3 in the main scanning direction, which is the Y direction intersecting the sub-scanning direction. Furthermore, the control unit 10 controls an ejection timing of the ink from the head unit 30 based on input image data. That is, the control unit 10 controls the movement of the carriage 32 along the main scanning direction and the transport of the medium P along the sub-scanning direction, and controls the ejection timing of the ink from the head unit 30 installed in the carriage 32. As a result, the liquid ejecting apparatus 1 can land the ink on a desired position of the transported medium P, and can form a desired image on the medium P.

2. Functional Configuration of Liquid Ejecting Apparatus

Figure 2:
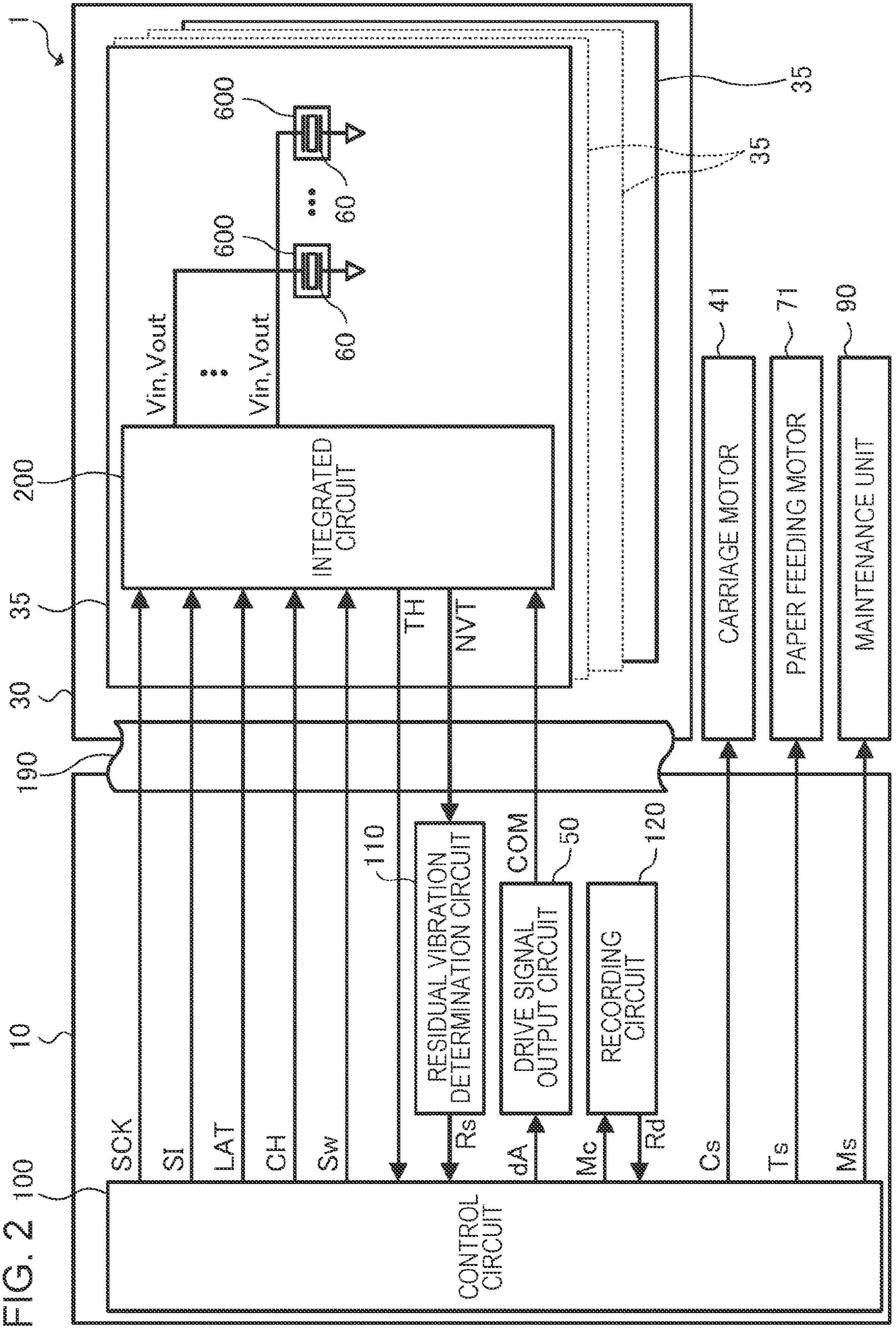
FIG. 2 is a diagram illustrating a functional configuration of the liquid ejecting apparatus.

Next, the details of the functional configuration of the liquid ejecting apparatus 1 will be described. FIG. 2 is a diagram illustrating a functional configuration of the liquid ejecting apparatus 1. As illustrated in FIG. 2, the liquid ejecting apparatus 1 includes the control unit 10, the head unit 30, the carriage motor 41, the paper feeding motor 71, and a maintenance unit 90.

The control unit 10 includes a control circuit 100, a drive signal output circuit 50, a residual vibration determination circuit 110, and a recording circuit 120.

The control circuit 100 includes, for example, a processor such as a central processing unit (CPU). The control circuit 100 generates and outputs data or various signals for controlling the liquid ejecting apparatus 1 based on various signals such as image data input from an external device such as a host computer provided outside the liquid ejecting apparatus 1.

Specifically, the control circuit 100 generates a reference drive signal dA, and outputs the reference drive signal dA to the drive signal output circuit 50. The drive signal output circuit 50 converts the input reference drive signal dA into a digital/analog signal, and then performs class D amplification on the converted analog signal to generate a drive signal COM and output the drive signal COM to the head unit 30. The reference drive signal dA may be a signal capable of defining a waveform of the drive signal COM, or may be an analog signal. In addition, the drive signal output circuit 50 may have a configuration capable of amplifying the waveform defined by the reference drive signal dA, and may include, for example, a class A amplifier circuit, a class B amplifier circuit, a class AB amplifier circuit, or the like.

The control circuit 100 generates a memory control signal Mc for controlling the recording circuit 120 and outputs the memory control signal Mc to the recording circuit 120. The recording circuit 120 is composed of a memory or the like (not illustrated). The recording circuit 120 records information defined by the memory control signal Mc input from the control circuit 100 in a predetermined recording area. In addition, the recording circuit 120 outputs the information instructed by the memory control signal Mc input from the control circuit 100 to the control circuit 100 as reading information Rd. That is, the control circuit 100 uses the memory control signal Mc to control the recording circuit 120 to record desired information in a predetermined recording area of the recording circuit 120, and controls the recording circuit 120 to read the information recorded in a predetermined area of the recording circuit 120. When the control circuit 100 records desired information in a predetermined recording area of the recording circuit 120, information to be recorded in the recording circuit 120 may be included in the memory control signal Mc. In this case, the information to be recorded in the recording circuit 120 may be propagated by a signal (not illustrated). In such a recording circuit 120, information defining the operation of the liquid ejecting apparatus 1, information for correcting various operations, and information indicating a state of an ejection section 600 and the like are recorded.

The control circuit 100 generates a clock signal SCK, a print data signal SI, a latch signal LAT, a change signal CH, and a switching control signal Sw in order to control the operation of the head unit 30, and outputs the clock signal SCK, the print data signal SI, the latch signal LAT, the change signal CH, and the switching control signal Sw to the head unit 30.

The head unit 30 is driven based on various control signals input from the control unit 10 to eject the ink. The head unit 30 has a plurality of print heads 35. The clock signal SCK, the print data signal SI, the latch signal LAT, the change signal CH, the switching control signal Sw, and the drive signal COM are input to each of the plurality of print heads 35. The different clock signal SCK, print data signal SI, latch signal LAT, change signal CH, switching control signal Sw, and drive signal COM are input to each of the plurality of print heads 35. The plurality of print heads 35 included in the head unit 30 have the same configuration, and in the following description, only one print head 35 will be described, and the description of the other print heads 35 will be omitted.

The print head 35 includes an integrated circuit 200 and a plurality of ejection sections 600.

The clock signal SCK, the print data signal SI, the latch signal LAT, the change signal CH, the switching control signal Sw, and the drive signal COM are input to the integrated circuit 200. Then, the integrated circuit 200 generates a drive signal Vin based on the input clock signal SCK, print data signal SI, latch signal LAT, change signal CH, and drive signal COM, and outputs the drive signal Vin to each of the plurality of ejection sections 600.

Specifically, the integrated circuit 200 generates the drive signal Vin corresponding to each of the plurality of ejection sections 600 by selecting or no selecting the waveform of the drive signal COM based on the clock signal SCK, the print data signal SI, the latch signal LAT, and the change signal CH. Then, the drive signal Vin generated by the integrated circuit 200 is supplied to one end of a piezoelectric element 60 included in each of the corresponding ejection sections 600. The piezoelectric element 60 is driven by being supplied with the drive signal Vin. By driving the piezoelectric element 60, the ink is ejected from the corresponding ejection section 600.

Further, a residual vibration Vout generated after the piezoelectric element 60 is driven is input to the integrated circuit 200. The integrated circuit 200 generates a residual vibration signal NVT according to a period of the input residual vibration Vout, and outputs the residual vibration signal NVT to the residual vibration determination circuit 110. The residual vibration determination circuit 110 determines whether or not an ejection abnormality occurs in the head unit 30 based on the input residual vibration signal NVT, and outputs a determination result signal Rs indicating the determination result to the control circuit 100. Here, the ejection abnormality means an abnormality in which the ink cannot be ejected normally from the ejection section 600. That is, in addition to a state in which the ejection section 600 cannot eject the ink to the medium P, the ejection abnormality includes a state in which the ejection section 600 cannot eject the normal amount of ink, a state in which the ink ejected from the ejection section 600 is not landed on a desired position of the medium P, and the like.

Further, the switching control signal Sw is input to the integrated circuit 200. The switching control signal Sw performs switching as to whether the integrated circuit 200 supplies the drive signal Vin generated based on the clock signal SCK, the print data signal SI, the latch signal LAT, the change signal CH, and the drive signal COM to the piezoelectric element 60 included in the ejection section 600 or whether the integrated circuit 200 outputs, to the residual vibration determination circuit 110, the residual vibration signal NVT corresponding to the residual vibration Vout generated after supplying the drive signal Vin to the piezoelectric element 60.

The integrated circuit 200 generates a temperature information signal TH indicating a temperature of the print head 35, and outputs the temperature information signal TH to the control circuit 100. The control circuit 100 controls various operations including correction of ink ejection conditions based on the input temperature information signal TH. Here, details of the configuration and operation of the integrated circuit 200 will be described later.

The control circuit 100 grasps whether or not the ejection abnormality occurs in the head unit 30 based on the determination result signal Rs input from the residual vibration determination circuit 110. When the input determination result signal Rs is a signal indicating that the ejection abnormality has occurred in the head unit 30, the control circuit 100 causes the maintenance unit 90 to perform maintenance processing for recovering a state of the ejection section 600.

Specifically, when the determination result signal Rs input from the residual vibration determination circuit 110 is a signal indicating that the ejection abnormality has occurred in the ejection section 600, the control circuit 100 generates a maintenance control signal Ms for causing the maintenance unit 90 to perform the maintenance processing in order to recover the ejection section 600, and output the maintenance control signal Ms to the maintenance unit 90. Here, the maintenance processing performed by the maintenance unit 90 includes a pump suction process of recovering the ejection section 600 by coupling a pump a cap that covers a nozzle surface to which the ink is ejected by the ejection section 600 and sucking the ink by the pump, a flushing process of recovering a viscosity of the ink that is stored in the ejection section 600 by forcibly driving the piezoelectric element 60 included in the ejection section 600, a wiping process of recovering the ejection section 600 by wiping the nozzle surface to which the ink is ejected from the ejection section 600 to remove paper dust adhering on the nozzle surface, and the like. The control circuit 100 may cause the maintenance unit 90 to perform the maintenance processing plural times based on the determination result signal Rs input from the residual vibration determination circuit 110, and may cause the maintenance unit 90 to perform the combination of the maintenance processing.

The control circuit 100 generates a carriage control signal Cs and outputs it to the carriage motor 41. Accordingly, the driving of the carriage motor 41 is controlled. As a result, the movement of the carriage 32 in the main scanning direction is controlled. Furthermore, the control circuit 100 generates a transport control signal Ts and outputs it to the paper feeding motor 71. Therefore, the driving of the paper feeding motor 71 is controlled, and as a result, the transport of the medium P along the sub-scanning direction is controlled.

As described above, the liquid ejecting apparatus 1 in the present embodiment includes the ejection section 600 ejecting the ink, which is an example of a liquid, the integrated circuit 200 detecting a state of the ejection section 600 based on the residual vibration Vout, the residual vibration determination circuit 110 determining whether or not the ejection section 600 has an abnormality based on the residual vibration signal NVT according to the residual vibration Vout output by the integrated circuit 200, and the maintenance unit 90 executing the maintenance processing on the ejection section 600. The maintenance processing performed by the maintenance unit 90 includes the wiping process of wiping the nozzle surface to which the ink is ejected from the ejection section 600, the flushing process of recovering the viscosity of the ink stored in the ejection section 600, and the like. Here, the residual vibration determination circuit 110 is an example of a determination section, the maintenance unit 90 is an example of a maintenance section, and the nozzle surface to which the ink is ejected from the ejection section 600 is an example of an ejection surface.

3. Configuration of Ejection Section

Figure 3:
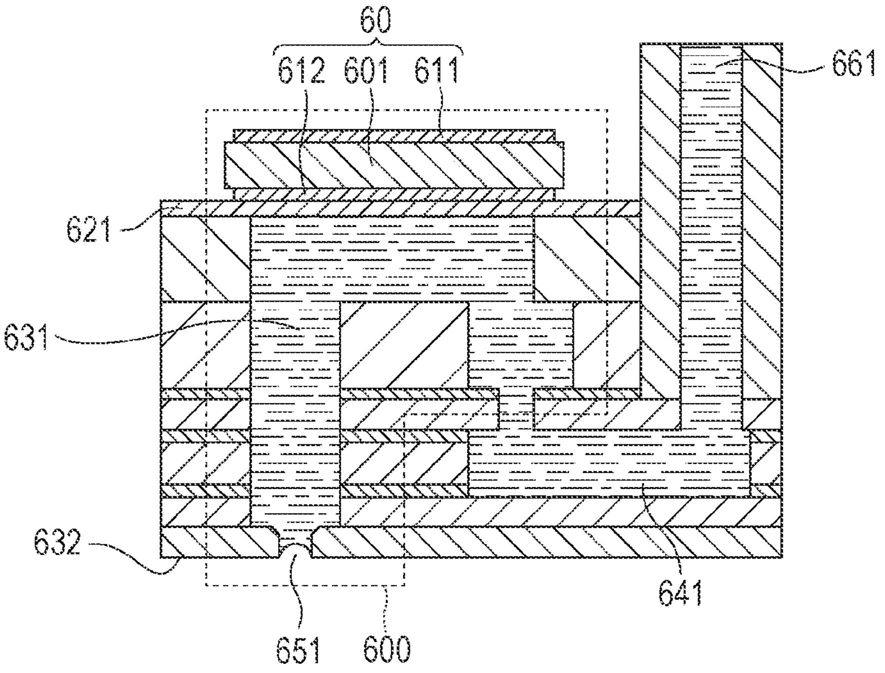
FIG. 3 is a view illustrating a schematic configuration of an ejection section.

Next, a configuration of the ejection section 600 included in the print head 35 will be described. FIG. 3 is a view illustrating a schematic configuration of one ejection section 600 among the plurality of ejection sections 600 included in the print head 35. As illustrated in FIG. 3, the ejection section 600 includes the piezoelectric element 60, a vibrating plate 621, a cavity 631, and a nozzle 651.

The cavity 631 is filled with ink supplied from a reservoir 641. In addition, the ink is introduced into the reservoir 641 via an ink flow path (not illustrated) and an ink supply port 661 from the ink cartridge 31. In other words, the cavity 631 is filled with the ink stored in the corresponding ink cartridge 31.

The vibrating plate 621 is displaced by driving the piezoelectric element 60 provided on an upper surface thereof in FIG. 3. Then, as the vibrating plate 621 is displaced, an internal volume of the cavity 631 filled with ink increases or decreases. In other words, the vibrating plate 621 functions as a diaphragm that changes the internal volume of the cavity 631.

The nozzle 651 is an opening portion that is provided in a nozzle plate 632 and communicates with the cavity 631. As the internal volume of the cavity 631 changes, the ink having an amount depending on the change in internal volume is ejected from the nozzle 651. That is, a surface of the nozzle plate 632 that faces the medium P corresponds to the nozzle surface.

The piezoelectric element 60 has a structure in which a piezoelectric body 601 is sandwiched between a pair of electrodes 611 and 612. In the piezoelectric body 601 having such a structure, the center part of the electrodes 611 and 612 is bent upward and downward together with the vibrating plate 621 corresponding to a potential difference of the voltage supplied by the electrodes 611 and 612. Specifically, the drive signal Vin is supplied to the electrode 611 of the piezoelectric element 60. In addition, a signal having a reference potential, serving as a reference for displacement of the piezoelectric element 60, is supplied to the electrode 612 of the piezoelectric element 60. The piezoelectric element 60 is bent upward when a voltage level of the drive signal Vin increases, and bent downward when the voltage level of the drive signal Vin decreases. Here, a signal of the reference potential, serving as a reference for displacement of the piezoelectric element 60, supplied by the electrode 612 of the piezoelectric element 60 may refer to, for example, a signal of a DC voltage having a constant potential such as 5.5 V or 6 V, or may refer to a ground potential.

In the ejection section 600 configured as described above, the piezoelectric element 60 is driven to be bent upward, and accordingly, the central part of the vibrating plate 621 is displaced upward and the internal volume of the cavity 631 increases. As a result, the ink is drawn from the reservoir 641. On the other hand, the piezoelectric element 60 is driven to be bent downward, and accordingly, the vibrating plate 621 is displaced and the internal volume of the cavity 631 decreases. As a result, the ink having an amount according to the degree of reduction is ejected from the nozzle 651. That is, the ejection section 600 includes the piezoelectric element 60 that ejects the ink by being driven.

The piezoelectric element 60 is not limited to the structure illustrated in FIG. 3, and may be any structure as long as the ink can be ejected from the ejection section 600. That is, the piezoelectric element 60 is not limited to the configuration of the bending vibration described above, and may have, for example, a configuration of vertical vibration.

4. Configuration of Integrated Circuit

Figure 4:
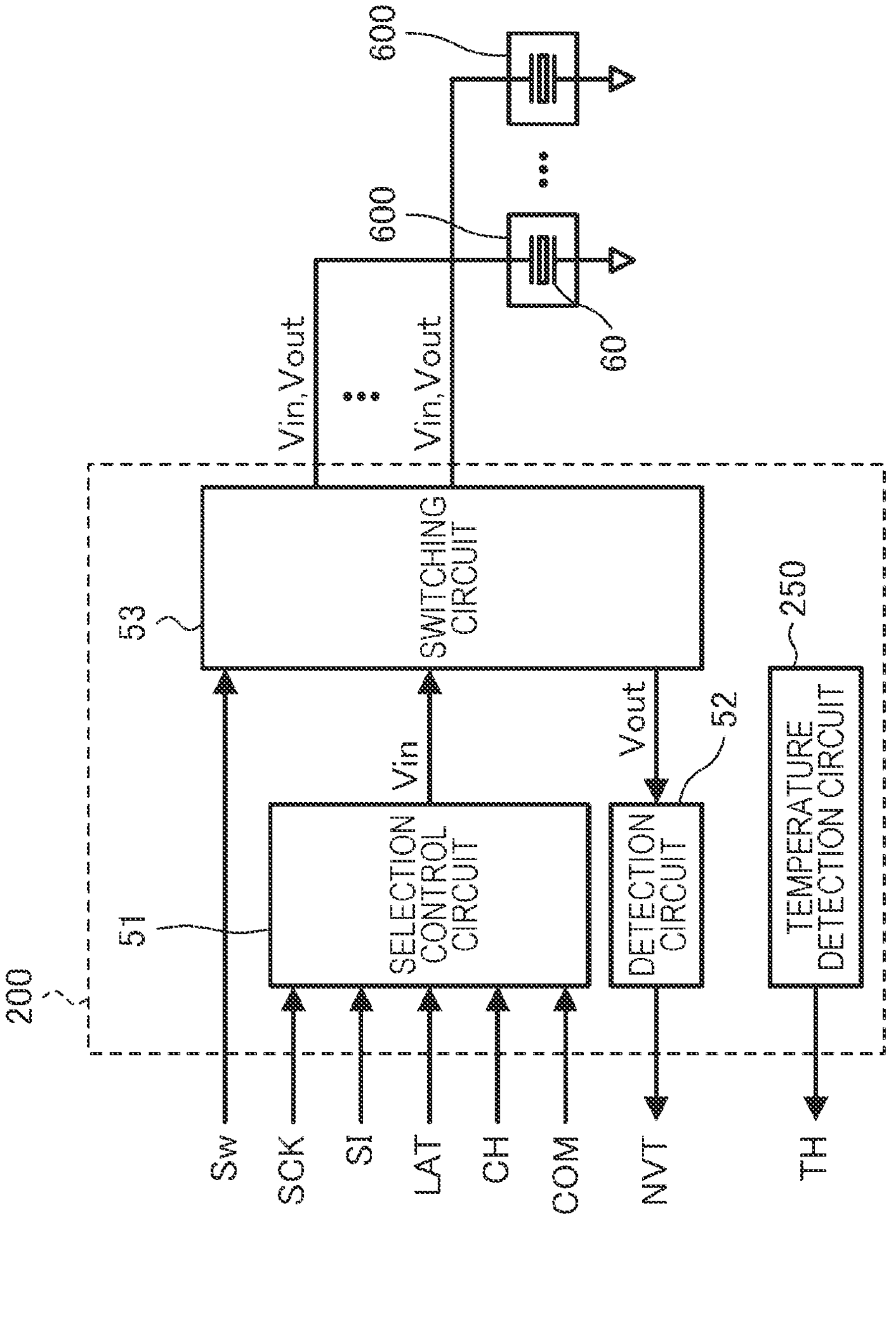
FIG. 4 is a diagram illustrating a functional configuration of an integrated circuit.

Next, the functional configuration and operation of the integrated circuit 200 will be described. FIG. 4 is a diagram illustrating a functional configuration of the integrated circuit 200. As described above, the integrated circuit 200 generates the drive signal Vin by selecting or not selecting a waveform included in the drive signal COM output by the drive signal output circuit 50 based on the clock signal SCK, the print data signal SI, the latch signal LAT, and the change signal CH input from the control circuit 100, and outputs the drive signal Vin to the piezoelectric element 60. Further, the integrated circuit 200 detects the residual vibration Vout generated after the piezoelectric element 60 is driven, generates the residual vibration signal NVT corresponding to the detected residual vibration Vout, and outputs the residual vibration signal NVT to the residual vibration determination circuit 110.

As illustrated in FIG. 4, the integrated circuit 200 includes a selection control circuit 51, a detection circuit 52, a switching circuit 53, and a temperature detection circuit 250.

The clock signal SCK, the print data signal SI, the latch signal LAT, and the change signal CH output by the control circuit 100, and the drive signal COM output by the drive signal output circuit 50 are input to the selection control circuit 51. The selection control circuit 51 generates the drive signal Vin and outputs it to the switching circuit 53 by selecting or not selecting a waveform included in the drive signal COM based on the clock signal SCK, the print data signal SI, the latch signal LAT, and the change signal CH.

The switching circuit 53 performs switching, based on the switching control signal Sw input from the control circuit 100, as to whether the drive signal Vin output by the selection control circuit 51 is supplied to the piezoelectric element 60 included in the ejection section 600 or whether the residual vibration Vout generated after the drive signal Vin is supplied to the piezoelectric element 60 is supplied to the detection circuit 52.

The detection circuit 52 generates the residual vibration signal NVT corresponding to the residual vibration Vout input from the switching circuit 53. The residual vibration signal NVT is output from the integrated circuit 200. Then, the residual vibration signal NVT output from the integrated circuit 200 is input to the residual vibration determination circuit 110 as described above.

The temperature detection circuit 250 detects a temperature of at least one of the print head 35 and the ejection section 600, and generates the temperature information signal TH corresponding to the detected temperature. The temperature information signal TH is output from the integrated circuit 200. Then, the temperature information signal TH output from the integrated circuit 200 is input to the control circuit 100 as described above. Here, the temperature information signal TH output by the temperature detection circuit 250 may be a signal including a voltage corresponding to the detected temperature, or may be a signal indicating whether or not the temperature detected by the temperature detection circuit 250 exceeds a predetermined threshold value. The temperature detection circuit 250 may be provided outside the integrated circuit 200.

Such a temperature detection circuit 250 may supply, for example, a desired current to a circuit element having temperature characteristics in that change is made depending on the temperature, and output a signal obtained by amplifying the voltage value generated across both ends of the circuit elements as the temperature information signal TH. Such a circuit element having the temperature characteristics in that change is made depending on the temperature may be, for example, a thermistor having a resistance value changed due to the temperature, or may be a diode having a forward voltage changed due to the temperature. Here, the temperature detection circuit 250 that detects the temperature of the print head 35 including the ejection section 600 is an example of a temperature detection section.

Next, details of functional configurations and operations of the selection control circuit 51, detection circuit 52, and switching circuit 53 included in the integrated circuit 200 will be described.

Figure 5:
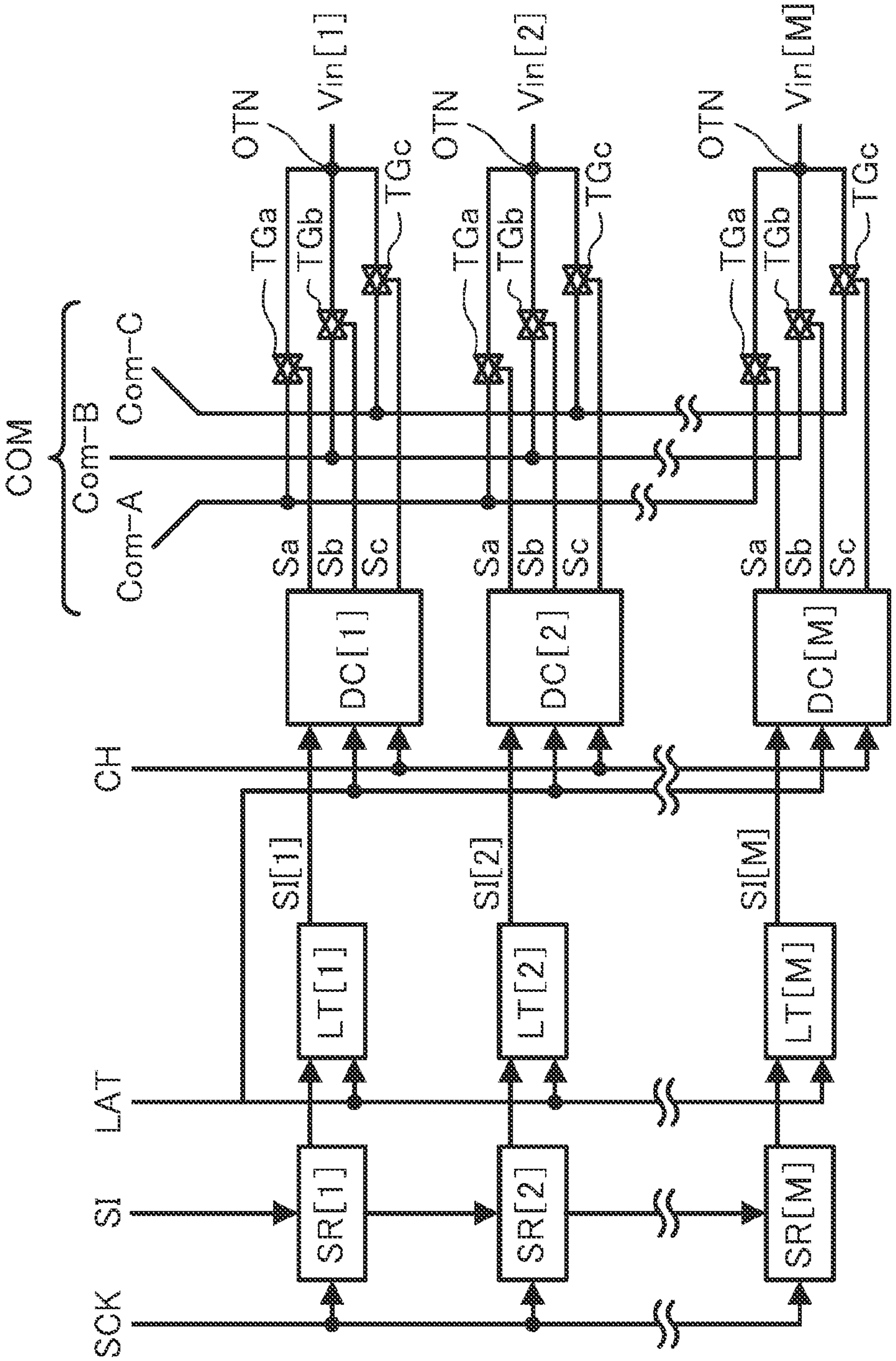
FIG. 5 is a diagram illustrating a functional configuration of a selection control circuit.

First, the functional configuration and operation of the selection control circuit 51 will be described with reference to FIGS. 5 to 8. FIG. 5 is a diagram illustrating a functional configuration of the selection control circuits 51. As illustrated in FIG. 5, the selection control circuit 51 includes M sets including a shift register SR, a latch circuit LT, a decoder DC, and a transmission gates TGa, TGb, and TGc, which has the same number as M ejection sections 600 included in the print head 35. That is, the selection control circuit 51 has a total of M sets including the shift register SR, the latch circuit LT, the decoder DC, and the transmission gates TGa, TGb, and TGc corresponding to the M ejection sections 600.

Here, in the following description, each element of the M sets may be referred to as a first stage, a second stage, . . . , and an M stage in order from the top in FIG. 5. FIG. 5 illustrates the shift register SR corresponding to each of the first stage, the second stage, . . . , and the M stage as SR[1], SR[2], . . . , SR[M], illustrates the latch circuit LT corresponding to each of the first stage, the second stage, . . . , and the M stage as LT[1], LT[2], . . . , and LT[M], illustrates the decoder DC corresponding to each of the first stage, the second stage, . . . , and the M stage as DC[1], DC[2], . . . , DC[M], and illustrates the drive signal Vin corresponding to each of the first stage, the second stage, . . . , and the M stage as Vin[1], Vin[2], . . . , Vin[M].

The clock signal SCK, the print data signal SI, the latch signal LAT, the change signal CH, and the drive signal COM are supplied to the selection control circuit 51. Here, the drive signal COM in the present embodiment includes three drive signals Com-A, Com-B, and Com-C as illustrated in FIG. 5. Specific examples of the three drive signals Com-A, Com-B, and Com-C included in the drive signal COM will be described later.

The print data signal SI is a digital signal that defines an amount of ink ejected from the nozzle 651 corresponding to a case in which one dot in an image is formed. Specifically, the print data signal SI includes 3-bit print data [b1, b2, b3] corresponding to each ejection section 600. The print data [b1, b2, b3] defines the amount of ink ejected from the nozzle 651 of the corresponding ejection section 600. Such a print data signal SI is input to the selection control circuit 51 as a serial signal serially containing the print data [b1, b2, b3] in synchronization with the clock signal SCK.

The selection control circuit 51 generates the drive signal Vin according to the amount of ink ejected from the nozzle 651 based on the input print data signal SI. When the drive signal Vin is supplied to the corresponding piezoelectric element 60, the piezoelectric element 60 is driven, and a predetermined amount of ink is ejected from the corresponding nozzle 651. As a result, dots representing four gradations of non-recording, a small dot, a medium dot, and a large dot are formed on the medium P. The selection control circuit 51 also generates the drive signal Vin for inspecting a state of the ejection section 600 including the nozzle 651 based on the input print data signal SI.

Each of the shift registers SR temporarily holds the print data signal SI for each of the 3-bit print data [b1, b2, b3] corresponding to each of the nozzles 651 of the ejection section 600, and sequentially transfers the print data signal SI to the subsequent shift register SR according to the clock signal SCK. Specifically, M shift registers SR in one-to-one correspondence with the M nozzles 651 are coupled in cascade. The print data signal SI that is serially supplied is sequentially transferred to the subsequent shift register SR according to the clock signal SCK. Then, the supply of the clock signal SCK is stopped at the time point when the print data signal SI is transferred to all of the M shift registers SR. As a result, the print data signal SI corresponding to each of the M ejection sections 600 is held in each of the M shift registers SR.

Each of the M latch circuits LT latches the 3-bit print data [b1, b2, b3] held in each of the M shift registers SR all at once in synchronization with rising of the latch signal LAT. Here, SI[1] to SI[M] illustrated in FIG. 5 indicates M print data [b1, b2, b3] that is held at each of the M shift registers SR[1] to SR[M] and latched by the latch circuits LT[1] to LT[M] at the rising of the latch signal LAT.

Meanwhile, an operation period in which the liquid ejecting apparatus 1 executes printing includes a plurality of unit operation periods Tu. Each unit operation period Tu includes a control period Ts1 and a control period Ts2 following the control period Ts1. The plurality of unit operation periods Tu include a unit operation period Tu in which printing processing for printing on the medium P in the liquid ejecting apparatus 1 is executed, a unit operation period Tu in which ejection abnormality detection processing for detecting the ejection abnormality of the ejection section 600 is performed, and a unit operation period Tu in which processes of both the printing processing and the ejection abnormality detection processing are executed.

The control circuit 100 supplies the print data signal SI to the selection control circuit 51 in each unit operation period Tu, and the latch circuit LT outputs the latch signal LAT for latching the 3-bit print data [b1, b2, b3] held in each of the shift registers SR in each unit operation period Tu. That is, in the control circuit 100 controls the selection control circuit 51 to supply the drive signal Vin according to an ejection amount of ink to the piezoelectric element 60 corresponding to the nozzle 651 included in each of the M ejection sections 600 in each unit operation period Tu.

Specifically, when the print head 35 performs only the printing processing in the unit operation period Tu, the control circuit 100 controls the selection control circuit 51 to supply the drive signal Vin for printing to the piezoelectric element 60 corresponding to the nozzle 651 included in the M ejection sections 600. In this case, an amount of ink according to the print data [b1, b2, b3] generated based on the image data input to the liquid ejecting apparatus 1 is ejected from each of the M nozzles 651. As a result, an image corresponding to the image data input to the liquid ejecting apparatus 1 is formed on the medium P.

On the other hand, when the print head 35 performs only the ejection abnormality detection processing in the unit operation period Tu, the control circuit 100 controls the selection control circuit 51 to supply the drive signal Vin for inspection to the piezoelectric element 60 corresponding to the nozzle 651 included in the M ejection sections 600.

Further, when the print head 35 performs both of the printing processing and the ejection abnormality detection processing in the unit operation period Tu, the control circuit 100 controls the selection control circuit 51 to supply the drive signal Vin for printing to a part of the piezoelectric element 60 corresponding to the nozzle 651 included in the M ejection sections 600, and controls the selection control circuit 51 to supply the drive signal Vin for inspection to the piezoelectric element 60 corresponding to the nozzle 651 included in the remaining ejection sections 600.

The decoder DC decodes the 3-bit print data [b1, b2, b3] latched by the latch circuit LT, and outputs selection signals Sa, Sb, and Sc that become H level or L level in each of the control periods Ts1 and Ts2.

FIG. 6 is a diagram illustrating an example of contents of decoding performed by the decoder DC. As illustrated in FIG. 6, for example, when the 3-bit print data [b1, b2, b3] is [1, 0, 0], the corresponding decoder DC sets the selection signal Sa to the H level, the selection signal Sb to the L level, and the selection signal Sc to the L level in the control period Ts1, and the corresponding decoder DC sets the selection signal Sa to the L level, the selection signal Sb to the H level, and the selection signal Sc to the L level in the control period Ts2.

Returning to FIG. 5, the M sets of transmission gates TGa, TGb, and TGc included in the selection control circuit 51 are provided so that they are in one-to-one correspondence with the M ejection sections 600.

That is, the selection control circuit 51 includes M sets of transmission gates TGa, TGb, and TGc in one-to-one correspondence with the nozzles 651 of each of the M ejection sections 600.

The transmission gate TGa is turned on when the selection signal Sa output from the decoder DC is in the H level, and is turned off when the selection signal Sa output from the decoder DC is in the L level. That is, the transmission gate TGa is conductive when the selection signal Sa is in the H level, and is non-conductive when the selection signal Sa is in the L level. Similarly, the transmission gate TGb is conductive when the selection signal Sb output from the decoder DC is in the H level, and is non-conductive when the selection signal Sb is in the L level, and the transmission gate TGc is conductive when the selection signal Sc output from the decoder DC is in the H level, and is non-conductive when the selection signal Sc is in the L level. For example, when the 3-bit print data [b1, b2, b3] is [1, 0, 0], in the control period Ts1, the transmission gate TGa is controlled to be turned on, the transmission gate TGb is controlled to be turned off, and the transmission gate TGc is controlled to be turned off. Thereafter, in the control period Ts2, the transmission gate TGa is controlled to be turned off, the transmission gate TGb is controlled to be turned on, and the transmission gate TGc is controlled to be turned off.

As illustrated in FIG. 5, the drive signal Com-A in the drive signal COM is supplied to one end of the transmission gate TGa, and the drive signal Com-B in the drive signal COM is supplied to one end of the transmission gate TGb, and the drive signal Com-C in the drive signal COM is supplied to one end of the transmission gate TGc. The other end of each of the transmission gates TGa, TGb, and TGc is coupled with the switching circuit 53 after being coupled in common at an output end OTN.

Figure 7:
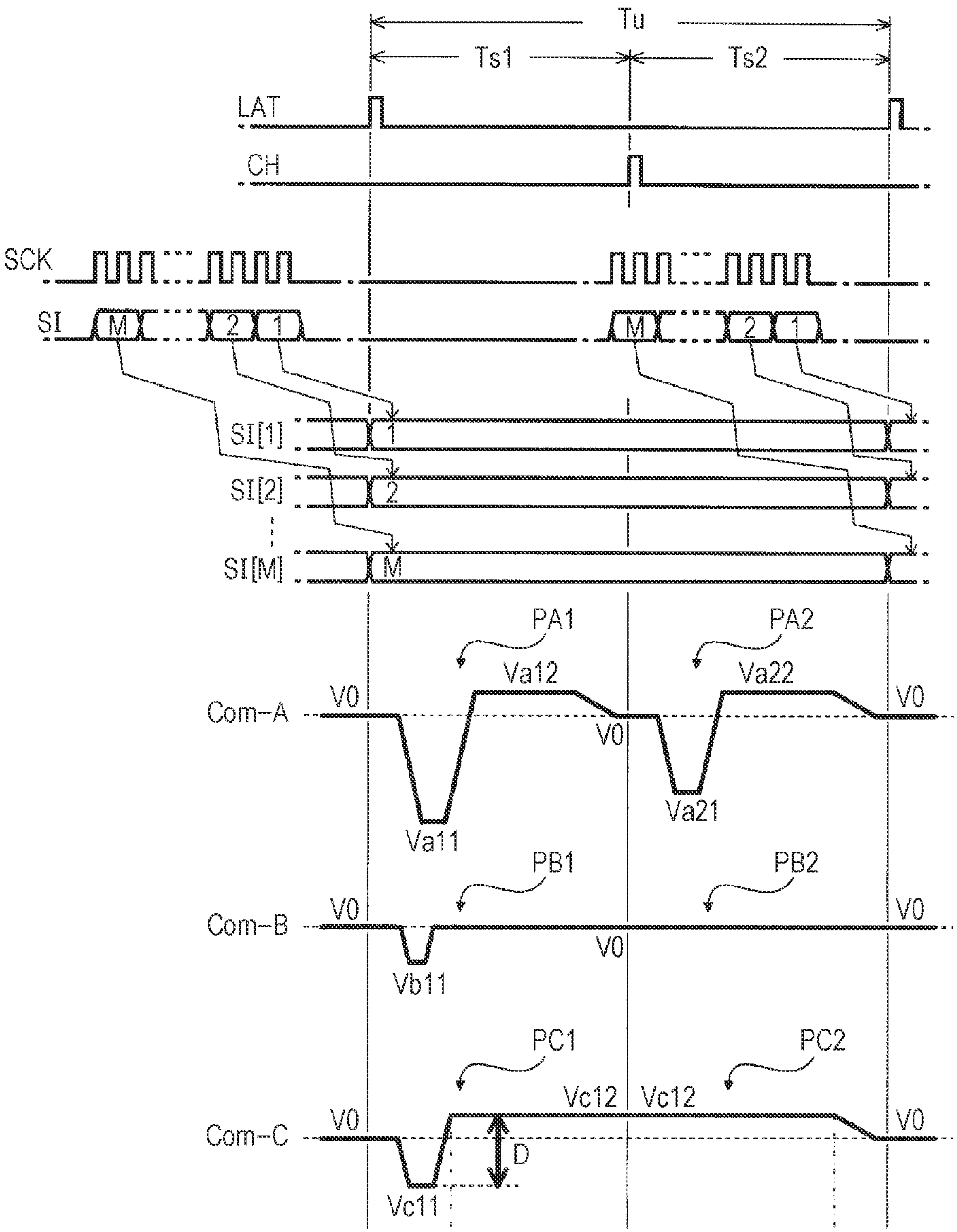
FIG. 7 is a diagram for explaining an operation of the selection control circuit in a unit operation period.

FIG. 7 is a diagram for explaining an operation of the selection control circuit 51 in the unit operation period Tu. As illustrated in FIG. 7, the unit operation period Tu is defined by the latch signal LAT output by the control circuit 100. In addition, the control periods Ts1 and Ts2 included in the unit operation period Tu are defined by the latch signal LAT and the change signal CH output by the control circuit 100. That is, the control circuit 100 defines the unit operation period Tu in which the printing processing is executed by the latch signal LAT, and defines the control periods Ts1 and Ts2 by dividing the unit operation period Tu by the change signal CH.

The drive signal Com-A in the drive signal COM supplied from the drive signal output circuit 50 is a signal for generating the drive signal Vin for printing in the unit operation period Tu, and includes a waveform in which a unit waveform PA1 arranged in the control period Ts1 and a unit waveform PA2 arranged in the control period Ts2 are continuous. Both potentials at timings to start and end the unit waveform PA1 and the unit waveform PA2 is a reference potential V0. Further, a potential difference between a potential Va11 and a potential Va12 of the unit waveform PA1 is larger than a potential difference between a potential Va21 and a potential Va22 of the unit waveform PA2. Therefore, an amount of ink ejected from the nozzle 651 corresponding to the piezoelectric element 60 when the piezoelectric element 60 is driven by the unit waveform PA1 is larger than an amount of ink ejected from the nozzle 651 when the piezoelectric element 60 is driven by the unit waveform PA2. Therefore, when the piezoelectric element 60 is driven by the unit waveform PA1, the amount of ink ejected from the nozzle 651 corresponding to the piezoelectric element 60 is referred to as a moderate amount, and when the piezoelectric element 60 is driven by the unit waveform PA2, the amount of ink ejected from the nozzle 651 is referred to as a small amount.

The drive signal Com-B in the drive signal COM supplied from the drive signal output circuit 50 is a signal for generating the drive signal Vin for printing in the unit operation period Tu, and includes a waveform in which a unit waveform PB1 arranged in the control period Ts1 and a unit waveform PB2 arranged in the control period Ts2 are continuous. Both potentials at timings to start and end the unit waveform PB1 is the reference potential V0, and a potential of the unit waveform PB2 is maintained at the reference potential V0 over the control period Ts2. Further, a potential difference between a potential Vb11 and the reference potential V0 of the unit waveform PB1 is smaller than a potential difference between a potential Va21 and a potential Va22 of the unit waveform PA2. When the piezoelectric element 60 corresponding to the nozzle 651 is driven by the unit waveform PB1, the piezoelectric element 60 is driven to an extent that the ink is not ejected from the corresponding nozzle 651. In addition, when the unit waveform PB2 is supplied to the piezoelectric element 60, the piezoelectric element 60 is not displaced. Thus, the ink is not ejected from the nozzle 651. Here, in the following description, driving of the piezoelectric element 60 to an extent that the ink is not ejected from the corresponding nozzle 651 by supplying the unit waveform PB1 may be referred to as a micro vibration, and in this case, a drive signal waveform may be referred to as a micro vibration waveform.

The drive signal Com-C in the drive signal COM supplied from the drive signal output circuit 50 is a signal for generating the drive signal Vin for inspection in the unit operation period Tu, and includes a waveform in which a unit waveform PC1 arranged in the control period Ts1 and a unit waveform PC2 arranged in the control period Ts2 are continuous. Both potentials at a timing to start unit waveform PC1 and at a timing to end the unit waveform PC2 are a reference potential V0. Further, the unit waveform PC1 transitions from the reference potential V0 to a potential Vc11, transitions from the potential Vc11 to a potential Vc12, and then is maintained at the potential Vc12 until the end of the control period Ts1. After maintaining the potential Vc12, the unit waveform PC2 transitions from the potential Vc12 to the reference potential V0 before the end of the control period Ts2.

As illustrated in FIG. 7, the print data signals SI[1] to SI[M] supplied as serial signals are sequentially propagated to the shift register SR by the clock signal SCK. Then, when the supply of the clock signal SCK is stopped, the print data signals SI[1] to SI[M] is held at each of the corresponding shift registers SR[1] to SR[M]. Thereafter, at a rising timing of the latch signal LAT, that is, a timing to start the unit operation period Tu, the M latch circuits LT included in the selection control circuit 51 latches the print data signals SI[1] to SI[M] held at the shift registers SR[1] to SR[M].

Each of the M decoders DC outputs, according to the contents illustrated in FIG. 6, the selection signals Sa, Sb, and Sc having logic levels according to the print data signals SI[1] to SI[M] latched by the latch circuit LT in each of the control periods Ts1 and Ts2.

Each of the M transmission gates TGa, TGb, and TGc is controlled to be conductive or non-conductive based on the logic level of the input selection signal Sa, Sb, or Sc. As a result, each of the drive signals Com-A, Com-B, and Com-C included in the drive signal COM is selected or not selected. As a result, the drive signal Vin is generated. This drive signal Vin is input to the switching circuit 53.

As described above, the selection control circuit 51 generates the drive signal Vin based on the drive signals Com-A, Com-B, Com-C and the 3-bit print data [b1, b2, b3]. Here, an example of the waveform of the drive signal Vin generated in the selection control circuit 51 will be described with reference to FIG. 8.

Figure 8:
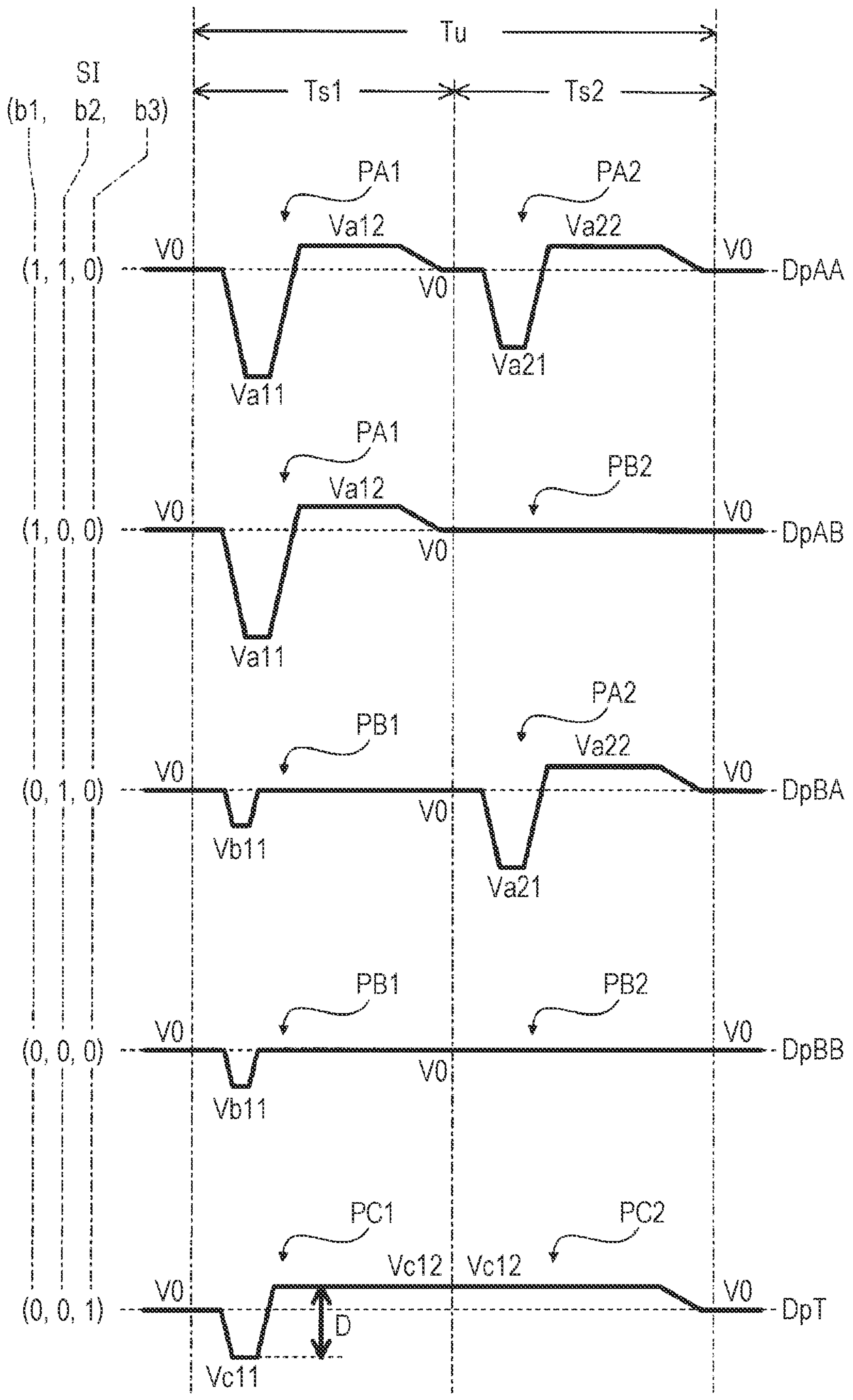
FIG. 8 is a diagram illustrating an example of waveforms of a drive signal Vin.

FIG. 8 is a diagram illustrating an example of waveforms of the drive signal Vin. As illustrated in FIG. 8, when the 3-bit print data [b1, b2, b3] included in the print data signal SI supplied to the selection control circuit 51 in the unit operation period Tu is [1, 1, 0], the decoder DC corresponding to the shift register SR, at which the print data [b1, b2, b3] is held, sets the logic levels of the selection signals Sa, Sb, and Sc to H, L, and L levels, respectively in the control period Ts1, and the decoder DC sets the logic levels of the selection signals Sa, Sb, and Sc to H, L, and L levels, respectively in the control period Ts2. Accordingly, each of the corresponding transmission gates TGa, TGb, and TGc selects the drive signal Com-A in the control period Ts1, and selects the drive signal Com-A in the control period Ts2. Therefore, the selection control circuit 51 outputs the drive signal Vin of the waveform in which the unit waveform PA1 and the unit waveform PA2 are continuous in the unit operation period Tu. As a result, the corresponding nozzle 651 ejects a moderate amount of ink based on the unit waveform PA1 and a small amount of ink based on the unit waveform PA2 in the unit operation period Tu. Then, the ink ejected from the nozzle 651 is landed on and bound to the medium P, thereby forming a large dot on the medium P.

When the 3-bit print data [b1, b2, b3] included in the print data signal SI supplied to the selection control circuit 51 in the unit operation period Tu is [1, 0, 0], the decoder DC corresponding to the shift register SR, at which the print data [b1, b2, b3] is held, sets the logic levels of the selection signals Sa, Sb, and Sc to H, L, and L levels, respectively in the control period Ts1, and the decoder DC sets the logic levels of the selection signals Sa, Sb, and Sc to L, H, and L levels, respectively in the control period Ts2. Accordingly, each of the corresponding transmission gates TGa, TGb, and TGc selects the drive signal Com-A in the control period Ts1, and selects the drive signal Com-B in the control period Ts2. Therefore, the selection control circuit 51 outputs the drive signal Vin of the waveform in which the unit waveform PA1 and the unit waveform PB2 are continuous in the unit operation period Tu. As a result, the corresponding nozzle 651 ejects a moderate amount of ink based on the unit waveform PA1 in the unit operation period Tu. Then, the ink ejected from the nozzle 651 is landed on the medium P, thereby forming a medium dot on the medium P.

When the 3-bit print data [b1, b2, b3] included in the print data signal SI supplied to the selection control circuit 51 in the unit operation period Tu is [0, 1, 0], the decoder DC corresponding to the shift register SR, at which the print data [b1, b2, b3] is held, sets the logic levels of the selection signals Sa, Sb, and Sc to L, H, and L levels, respectively in the control period Ts1, and the decoder DC sets the logic levels of the selection signals Sa, Sb, and Sc to H, L, and L levels, respectively in the control period Ts2. Accordingly, each of the corresponding transmission gates TGa, TGb, and TGc selects the drive signal Com-B in the control period Ts1, and selects the drive signal Com-A in the control period Ts2. Therefore, the selection control circuit 51 outputs the drive signal Vin of the waveform in which the unit waveform PB1 and the unit waveform PA2 are continuous in the unit operation period Tu. As a result, the corresponding nozzle 651 ejects a small amount of ink based on the unit waveform PA2 in the unit operation period Tu. Then, the ink ejected from the nozzle 651 is landed on the medium P, thereby forming a small dot on the medium P.

When the 3-bit print data [b1, b2, b3] included in the print data signal SI supplied to the selection control circuit 51 in the unit operation period Tu is [0, 0, 0], the decoder DC corresponding to the shift register SR, at which the print data [b1, b2, b3] is held, sets the logic levels of the selection signals Sa, Sb, and Sc to L, H, and L levels, respectively in the control period Ts1, and the decoder DC sets the logic levels of the selection signals Sa, Sb, and Sc to L, H, and L levels, respectively in the control period Ts2. Accordingly, each of the corresponding transmission gates TGa, TGb, and TGc selects the drive signal Com-B in the control period Ts1, and selects the drive signal Com-B in the control period Ts2. Therefore, the selection control circuit 51 outputs the drive signal Vin of the waveform in which the unit waveform PB1 and the unit waveform PB2 are continuous in the unit operation period Tu. As a result, the corresponding nozzle 651 does not eject the ink in the unit operation period Tu, and thus no dots are formed on the medium P. In this case, the drive signal Vin output by the selection control circuit 51 drives the piezoelectric element 60 to an extent that the ink is not ejected from the nozzle 651. That is, the corresponding ejection section 600 is micro-vibrated. Accordingly, it is possible to prevent the ink from thickening in the vicinity of the nozzle 651.

When the 3-bit print data [b1, b2, b3] included in the print data signal SI supplied to the selection control circuit 51 in the unit operation period Tu is [0, 0, 1], the decoder DC corresponding to the shift register SR, at which the print data [b1, b2, b3] is held, sets the logic levels of the selection signals Sa, Sb, and Sc to L, L, and H levels, respectively in the control period Ts1, and the decoder DC sets the logic levels of the selection signals Sa, Sb, and Sc to L, L, and H levels, respectively in the control period Ts2. Accordingly, each of the corresponding transmission gates TGa, TGb, and TGc selects the drive signal Com-C in the control period Ts1, and selects the drive signal Com-C in the control period Ts2. Therefore, the selection control circuit 51 outputs the drive signal Vin of the waveform in which the unit waveform PC1 and the unit waveform PC2 are continuous in the unit operation period Tu. As a result, the corresponding nozzle 651 does not eject the ink in the unit operation period Tu, and thus no dots are formed on the medium P. In this case, the drive signal Vin output by the selection control circuit 51 corresponds to an inspection waveform for detecting the residual vibration Vout generated by driving the piezoelectric element 60.

As described above, the selection control circuit 51 generates the drive signal Vin corresponding to dots representing four gradations of non-recording, a small dot, a medium dot, and a large dot and the drive signal Vin for inspection and outputs the drive signal Vin and the drive signal Vin for inspection to the switching circuit 53, by selecting and not selecting the waveform included in the drive signal COM output by the drive signal output circuit 50, based on the clock signal SCK, print data signal SI, latch signal LAT, and change signal CH output by the control circuit 100.

Figure 9:
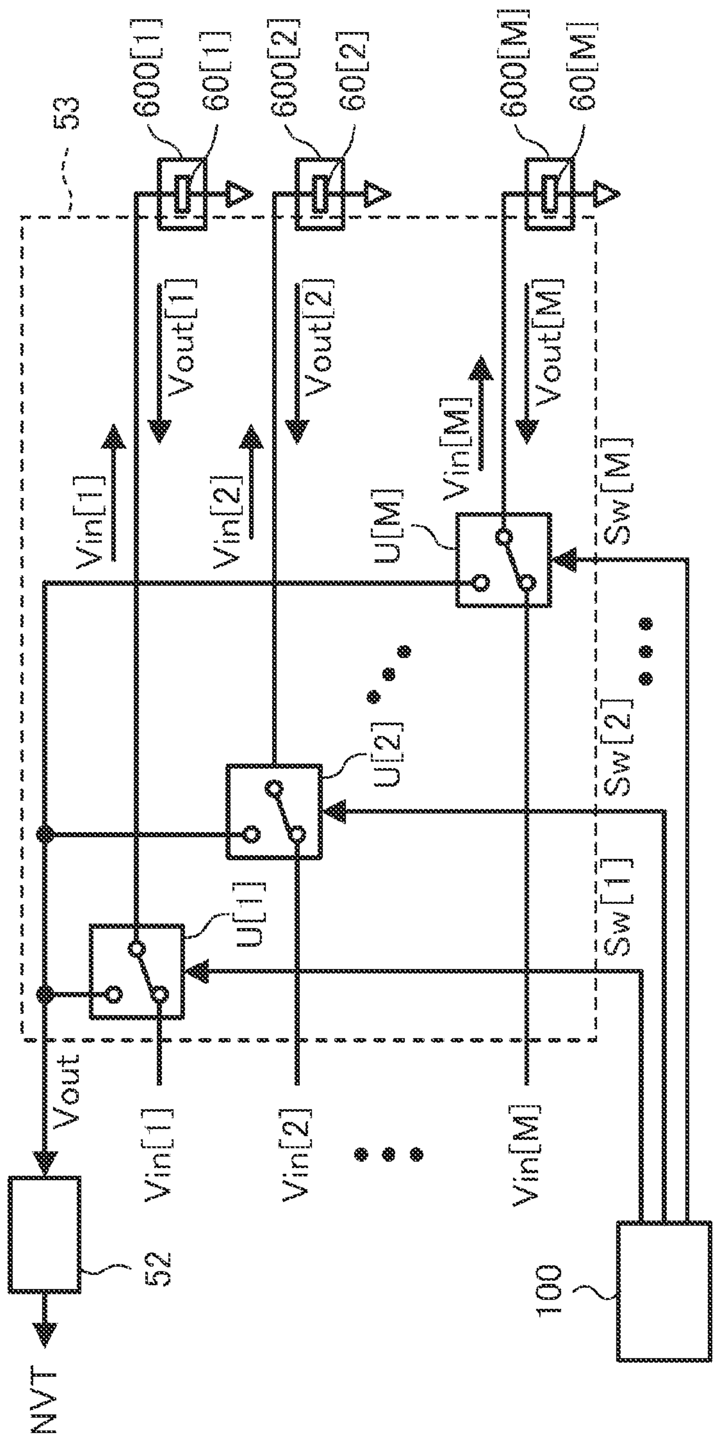
FIG. 9 is a diagram illustrating functional configurations of a switching circuit and a detection circuit.

Next, the functional configurations and operations of the switching circuit 53 and the detection circuit 52 will be described. FIG. 9 is a diagram illustrating functional configurations of the switching circuit 53 and the detection circuit 52. Here, FIG. 9 illustrates a transfer switch U corresponding to each of a first stage, a second stage, . . . , an M stage as U[1], U[2], . . . , U[M], illustrates the ejection section 600 corresponding to each of the first stage, the second stage, . . . , the M stage as 600[1], 600[2], . . . , 600[M], illustrates the piezoelectric element 60 corresponding to each of the first stage, the second stage, . . . , the M stage as 60[1], 60[2], . . . , 60[M], illustrates the switching control signal Sw corresponding to each of the first stage, the second stage, . . . , the M stage as Sw[1], Sw[2], . . . , Sw[M], and illustrates the residual vibration Vout corresponding to each of the first stage, the second stage, . . . , the M stage as residual vibrations Vout[1], Vout[2], . . . , Vout[M].

As illustrated in FIG. 9, the switching circuit 53 has M transfer switches U corresponding to the piezoelectric elements 60 included in the M ejection sections 600. Each transfer switch U performs switching, based on the switching control signal Sw, as to whether the drive signal Vin input from the selection control circuit 51 is supplied to the corresponding piezoelectric element 60 or whether the residual vibration Vout generated after the drive signal Vin is supplied to the piezoelectric element 60 is supplied to the detection circuit 52.

Specifically, the switching control signal Sw[1] is input to the transfer switch U[1]. Then, the transfer switch U[1] performs switching, based on the switching control signal Sw[1], as to whether the drive signal Vin[1] is supplied to the piezoelectric element 60[1] included in the ejection section 600[1] or whether the residual vibration Vout[1] generated after the drive signal Vin[1] is supplied to the piezoelectric element 60[1] is supplied to the detection circuit 52.

Similarly, the switching control signal Sw[i] is input to the transfer switch U[i]. Then, the transfer switch U[i] performs switching, based on the switching control signal Sw[i], as to whether the drive signal Vin[i] is supplied to the piezoelectric element 60[*i*] included in the ejection section 600[*i*] or whether the residual vibration Vout[i] generated after the drive signal Vin[i] is supplied to the piezoelectric element 60[*i*] is supplied to the detection circuit 52.

Here, the switching control signals Sw[1] to Sw[M] control the switching of transfer switches U[1] to U[M] so that any one of the M piezoelectric elements 60[1] to 60[M] is electrically coupled to the detection circuit 52 in the unit operation period Tu. In other words, the detection circuit 52 detects any one of the residual vibrations Vout [1] to Vout[M] corresponding to the M piezoelectric elements 60[1] to 60[M] based on the switching control signal Sw, and generates the residual vibration signal NVT in the corresponding nozzle 651.

Figure 10:
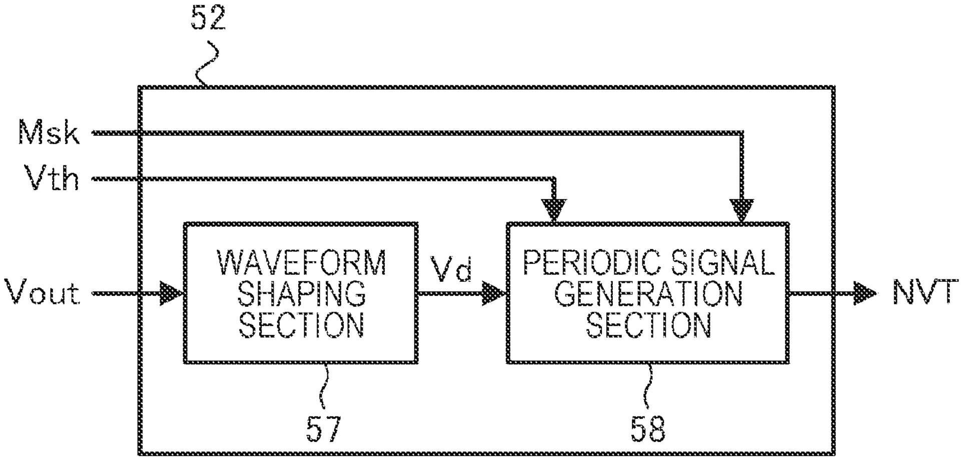
FIG. 10 is a diagram illustrating a functional configuration of the detection circuit.

Next, the functional configuration of the detection circuit 52 will be described. FIG. 10 is a diagram illustrating a functional configuration of the detection circuit 52. The detection circuit 52 detects the residual vibration Vout input via the switching circuit 53, generates and outputs the residual vibration signal NVT according to the detected residual vibration Vout.

As illustrated in FIG. 10, the detection circuit 52 includes a waveform shaping section 57 and a periodic signal generation section 58. The waveform shaping section 57 generates a shaped waveform signal Vd in which a noise component is removed from the residual vibration Vout. For example, the waveform shaping section 57 includes a high-pass filter for outputting a signal in which a frequency component in a band lower than a frequency band of the residual vibration Vout is attenuated, a low-pass filter for outputting a signal in which a frequency component in a band higher than the frequency band of the residual vibration Vout is attenuated, and the like. As a result, the waveform shaping section 57 can output the shaped waveform signal Vd by limiting a frequency range of the residual vibration Vout and removing the noise component. Here, as a circuit in which the waveform shaping section 57 removes the noise component from the residual vibration Vout, a negative feedback type amplifier circuit for adjusting an amplitude of the residual vibration Vout, a voltage follower circuit for converting an impedance of the residual vibration Vout, or the like may be used.

The periodic signal generation section 58 generates the residual vibration signal NVT indicating at least one of the period, vibration frequency, and phase of the residual vibration Vout based on the shaped waveform signal Vd, and outputs the residual vibration signal NVT from the integrated circuit 200. The shaped waveform signal Vd, a mask signal Msk, and a threshold potential Vth are input to the periodic signal generation section 58. Here, the mask signal Msk and the threshold potential Vth may be supplied from, for example, the control circuit 100, or may be generated inside the integrated circuit 200.

Figure 11:
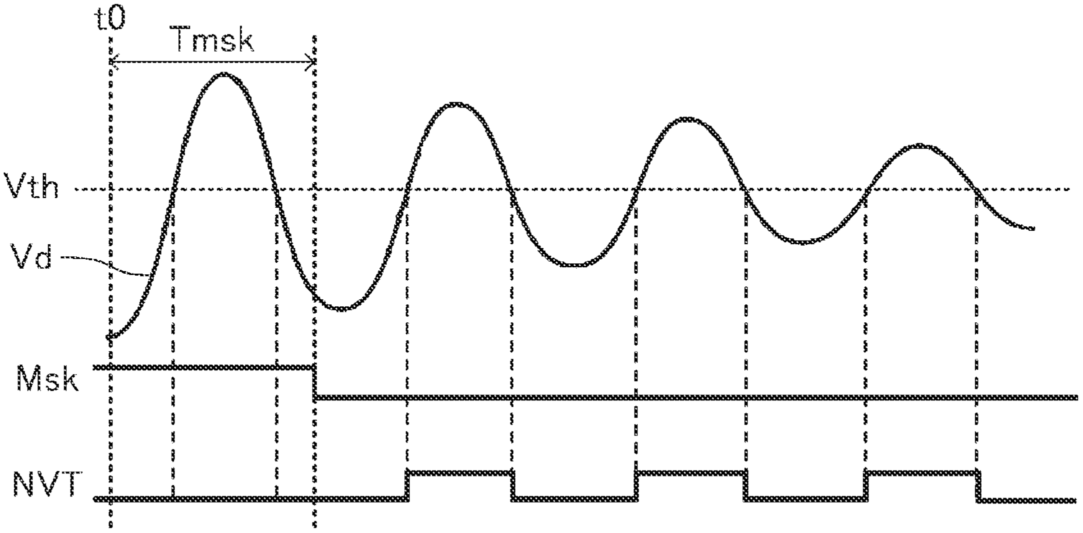
FIG. 11 is a diagram for explaining an operation of the periodic signal generation section.

FIG. 11 is a diagram for explaining an operation of the periodic signal generation section 58. As illustrated in FIG. 11, the threshold potential Vth is a threshold value defined as a potential at a predetermined level in the amplitude of the shaped waveform signal Vd, and for example, is defined as a potential at a center level in the amplitude of the shaped waveform signal Vd. Then, the periodic signal generation section 58 generates and outputs the residual vibration signal NVT based on the input shaped waveform signal Vd and threshold potential Vth.

Specifically, the periodic signal generation section 58 compares the potential of the shaped waveform signal Vd with the threshold potential Vth. Then, the periodic signal generation section 58 generates the residual vibration signal NVT that becomes H level when the potential of the shaped waveform signal Vd is equal to or higher than the threshold potential Vth and becomes L level when the potential of the shaped waveform signal Vd is lower than the threshold potential Vth. That is, a logic level of the residual vibration signal NVT transitions from the H level to the L level, a period until the logic level of the residual vibration signal NVT becomes the H level again corresponds to the period of the residual vibration Vout, the reciprocal of the period corresponds to the vibration frequency of the residual vibration Vout, and a timing at which the logic level of the residual vibration signal NVT transitions from the H level to the L level from an arbitrary time or a timing at which the logic level of the residual vibration signal NVT transitions from the L level to the H level corresponds to the phase.

The mask signal Msk is a signal that becomes the H level only during a predetermined period Tmsk from a time t0 when the supply of the shaped waveform signal Vd is started. The periodic signal generation section 58 stops to generate the residual vibration signal NVT in a period when the mask signal Msk is in the H level, and generates the residual vibration signal NVT in the period when the mask signal Msk is in the H level. That is, the periodic signal generation section 58 generates the residual vibration signal NVT only for the shaped waveform signal Vd after the period Tmsk has elapsed among the shaped waveform signals Vd. As a result, the periodic signal generation section 58 can exclude the noise component superimposed immediately after the residual vibration Vout is generated, and can generate the residual vibration signal NVT with high accuracy.

As described above, in the integrated circuit 200 in the present embodiment, the selection control circuit 51 generates the drive signal Vin by selecting or not selecting a waveform of the drive signal COM output by the drive signal output circuit 50 based on the clock signal SCK, print data signal SI, latch signal LAT, and change signal CH input from the control circuit 100, and supplies the drive signal Vin to the piezoelectric element 60 included in the ejection section 600 via the switching circuit 53. Further, the switching circuit 53 supplies the residual vibration Vout generated after the piezoelectric element 60 is driven to the detection circuit 52. The detection circuit 52 detects the input residual vibration Vout, generates a residual vibration signal NVT corresponding to the residual vibration Vout, and outputs the residual vibration signal NVT from the integrated circuit 200. The residual vibration signal NVT output from the integrated circuit 200 is supplied to the residual vibration determination circuit 110.

5. Determination of State of Ejection Section Based on Residual Vibration

Next, a determination operation in the residual vibration determination circuit 110 will be described. The residual vibration determination circuit 110 determines a state of the corresponding ejection section 600 based on the residual vibration signal NVT input from the integrated circuit 200, and generates the determination result signal Rs indicating the determination result. Then, the residual vibration determination circuit 110 outputs the generated determination result signal Rs to the control circuit 100. That is, the residual vibration determination circuit 110 determines whether or not the corresponding ejection section 600 has an abnormality based on the residual vibration signal NVT output by the detection circuit 52 included in the integrated circuit 200, and outputs the determination result signal Rs indicating the determination result to the control circuit 100.

Specifically, the residual vibration determination circuit 110 determines whether or not the corresponding ejection section 600 has an abnormality based on at least one of the period, frequency, and phase of the input residual vibration signal NVT. When the ejection abnormality has occurred in the corresponding ejection section 600, the residual vibration determination circuit 110 estimates a cause of the ejection abnormality, and outputs the determination result signal Rs including the estimated result to the control circuit 100.

Here, to describe the determination of the state of the ejection section 600 based on the residual vibration signal NVT in the residual vibration determination circuit 110, a relationship between the residual vibration Vout and whether or not the ejection section 600 has an abnormality and a relationship between the residual vibration Vout and the ejection abnormality of the ejection section 600 will be described. In the following description, a relationship between the residual vibration Vout generated in the vibrating plate 621 that is displaced with the driving of the piezoelectric element 60 after the drive signal Vin is supplied to the piezoelectric element 60, and the cause of the ejection abnormality occurred in the ejection section 600 will be described by using a calculation value obtained by calculation based on a calculation model and an experimental value obtained by an experiment.

First, the residual vibration Vout will be described. The residual vibration Vout means attenuating vibration generated until the ejection section 600 starts the next ink ejection operation after the ejection operation for ejecting the ink from the nozzle 651 has ended by driving the piezoelectric element 60 with the supply of the drive signal Vin to the ejection section 600. For example, the residual vibration Vout is generated in the vibrating plate 621 that functions as a diaphragm for changing the internal volume of the cavity 631. It is assumed that the residual vibration Vout generated in the vibrating plate 621 includes an acoustic resistance r defined by a shape of the nozzle 651 that ejects the ink or a shape of the ink supply port 661 that supplies the ink, or a viscosity of the ink, inertance m defined by a weight of the ink stored in an ink flow path through which the ink flows, and a natural vibration frequency defined by a compliance Cm of the vibrating plate 621.

Figure 12:
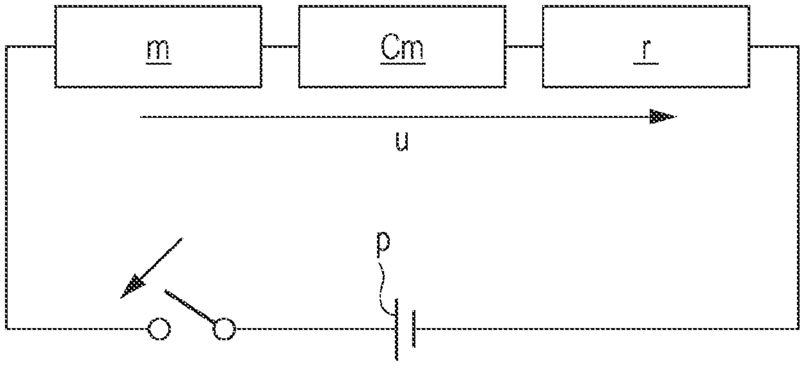
FIG. 12 is a diagram illustrating a relationship between a calculation value and an experimental value of residual vibration of a vibrating plate.

FIG. 12 is a diagram illustrating a calculation model of a simple vibration that assumes the residual vibration Vout generated in the vibrating plate 621. As illustrated in FIG. 12, the calculation model of the residual vibration Vout generated in the vibrating plate 621 can be expressed by a sound pressure p, the inertance m, the compliance Cm, and the acoustic resistance r. When a volume velocity u, which is a step response in a case where the sound pressure p is applied to the calculation model illustrated in FIG. 12, is calculated, the following Equations (1), (2), and (3) are obtained.

$$u = \frac{p}{\omega \cdot m} e^{-\alpha \cdot t} \cdot \sin\omega t \tag{1}$$

$$\omega = \sqrt{\frac{1}{m \cdot C_m} - \alpha^2} \tag{2}$$

$$\alpha = \frac{r}{2m} \tag{3}$$

Figure 13:
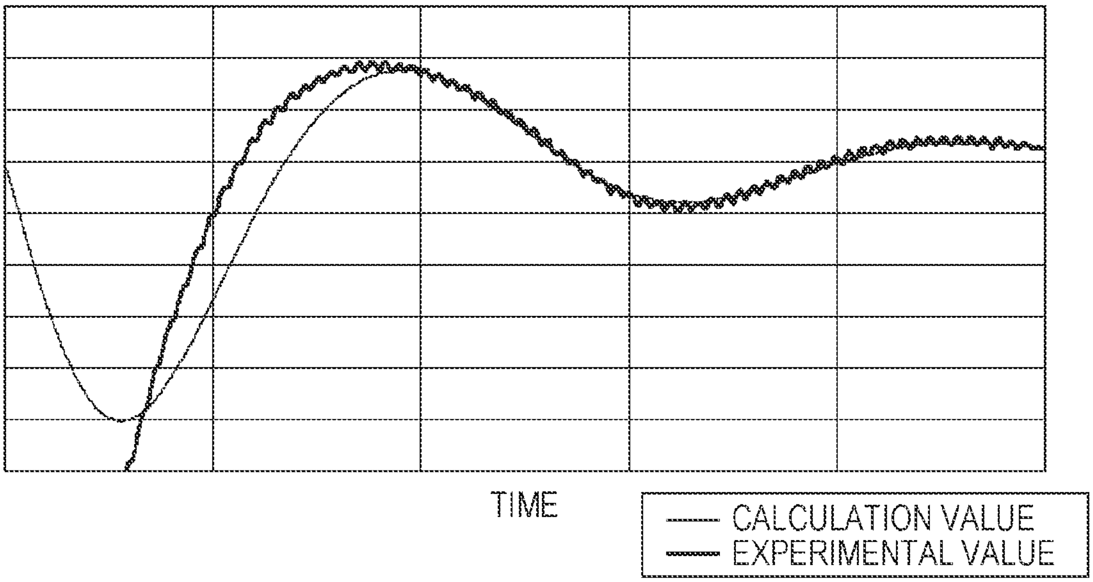
FIG. 13 is a diagram illustrating a relationship between a calculation value and an experimental value of residual vibration of a vibrating plate.

Then, the calculation value obtained from Equations (1) to (3) is compared with the experimental value obtained by the experiment in which the residual vibration Vout generated in the vibrating plate 621 after the ink is ejected from the ejection section 600 is actually acquired. FIG. 13 is a diagram illustrating a relationship between the calculation value and the experimental value of the residual vibration Vout of the vibrating plate 621. As can be seen from the results illustrated in FIG. 13, a waveform of the calculation value and a waveform of the experimental value almost match.

Here, three causes are assumed for the ejection abnormality estimated based on the residual vibration signal NVT, which is the ejection abnormality occurred in the ejection section 600: firstly, bubble mixing in which bubbles are mixed in the cavity 631, secondly, dry thickening in which the ink in the vicinity of the nozzle 651 is thickened by drying, and thirdly, paper dust adhesion in which paper dust adheres to the vicinity of an outlet of the nozzle 651. In the following, the ejection abnormality occurred in the print head 35 will be examined according to the above-mentioned causes, based on the comparison result illustrated in FIG. 13.

Figure 14:
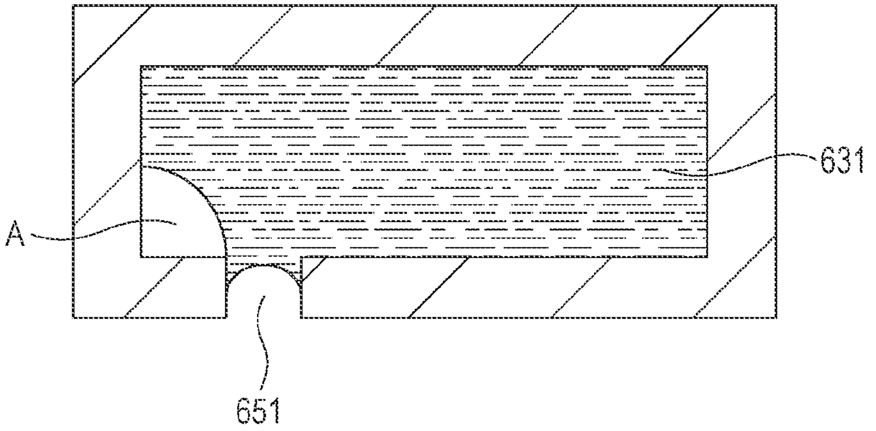
FIG. 14 is a view conceptually illustrating the vicinity of a nozzle when bubbles are mixed.

First, the bubble mixing, which is a cause of the ejection abnormality, will be examined. FIG. 14 is a view conceptually illustrating the vicinity of the nozzle 651 when the bubble mixing has occurred. As illustrated in FIG. 14, when bubbles A are mixed in the cavity 631, it is assumed that the bubbles A are generated and adhered to a wall surface inside the cavity 631. Therefore, when the bubbles A are mixed in the cavity 631, it is considered that a total weight of the ink filled in the cavity 631 decreases, and the inertance m decreases as the total weight of the ink decreases. Furthermore, as illustrated in FIG. 14, when the bubbles A adhere to the vicinity of the nozzle 651, a diameter of the nozzle 651 is increased by a size of a diameter of the bubbles A. As a result, it is considered that the acoustic resistance r is reduced. Therefore, when a calculation based on the calculation model in which the acoustic resistance r and inertance m are set to be small is performed on the calculation value when the ink is normally ejected as illustrated in FIG. 13, a result as in FIG. 15, in which the calculation value obtained by the calculation and the experimental value of the residual vibration Vout when the bubbles are mixed almost match, is obtained.

Figure 15:
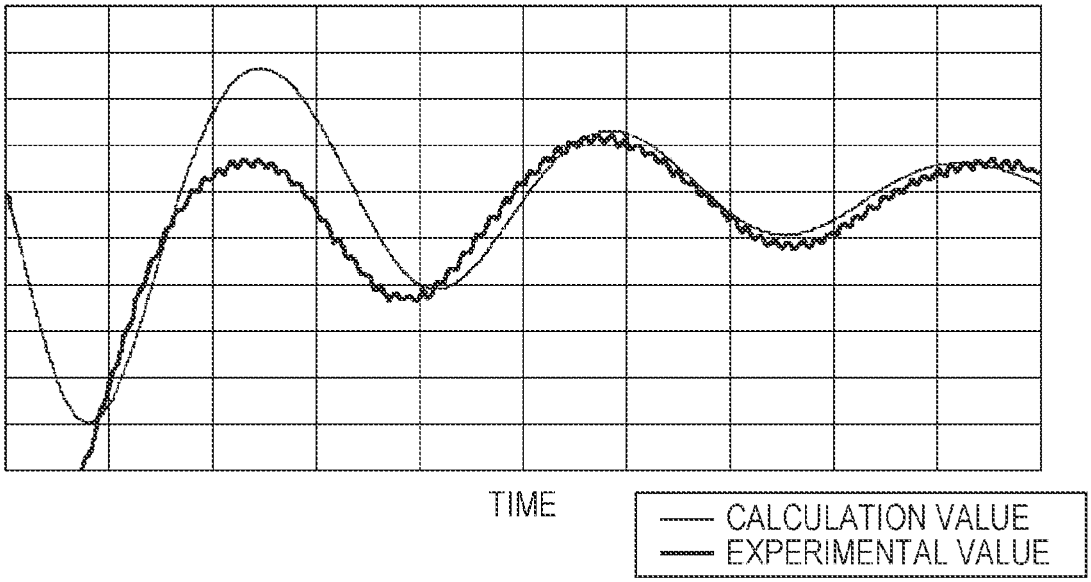
FIG. 15 is a diagram illustrating a relationship between an experimental value and a calculation value of residual vibration generated in the vibrating plate when bubbles are mixed.

FIG. 15 is a diagram illustrating a relationship between an experimental value and a calculation value of the residual vibration Vout generated in the vibrating plate 621 when the bubbles are mixed. As illustrated in FIGS. 13 and 15, when the bubbles A are mixed in the cavity 631, a characteristic waveform of the residual vibration Vout having a higher frequency than when the ink is normally ejected is obtained. Furthermore, it can be confirmed that an attenuation rate of the amplitude of the residual vibration Vout is also reduced due to the decrease in the acoustic resistance r and the like, and as a result, the residual vibration Vout slowly decreases its amplitude. That is, the frequency and phase of the residual vibration Vout when the ejection abnormality caused by the bubble mixing has occurred in the ejection section 600 change with respect to the residual vibration Vout when the ejection section 600 is normal.

Figure 16:
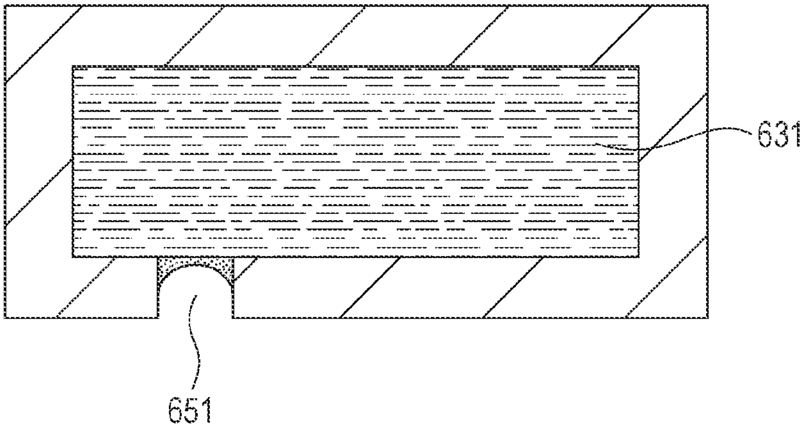
FIG. 16 is a view conceptually illustrating the vicinity of a nozzle when dry thickening has occurred.

Next, the dry thickening, which is another cause of the ejection abnormality, will be examined. FIG. 16 is a view conceptually illustrating the vicinity of the nozzle 651 when the dry thickening has occurred. As illustrated in FIG. 16, when the ink in the vicinity of the nozzle 651 is dried and fixed, the ink is confined in the cavity 631. As a result, when the ink in the vicinity of the nozzle 651 is dried and thickened, it is considered that the acoustic resistance r is increased. Therefore, when a calculation based on the calculation model in which the acoustic resistance r is set to be large is performed on the calculation value when the ink is normally ejected as illustrated in FIG. 13, a result as in FIG. 17, in which the calculation value obtained by the calculation and the experimental value of the residual vibration Vout when the dry thickening has occurred almost match, is obtained.

Figure 17:
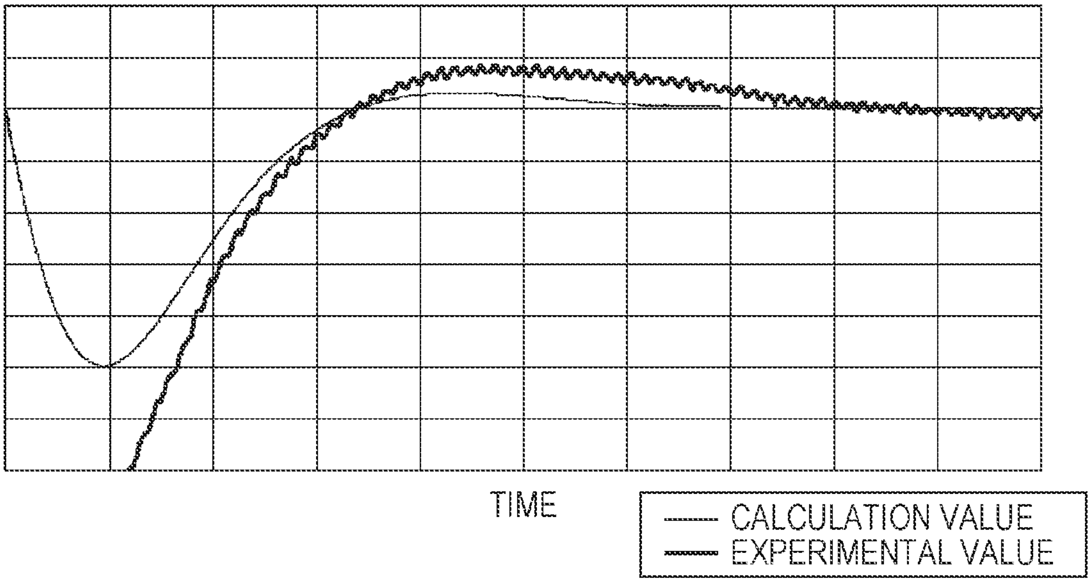
FIG. 17 is a diagram illustrating a relationship between an experimental value and a calculation value of residual vibration generated in the vibrating plate when dry thickening occurs.

FIG. 17 is a diagram illustrating a relationship between an experimental value and a calculation value of the residual vibration Vout generated in the vibrating plate 621 when the dry thickening occurs. The experimental values illustrated in FIG. 17 is a value obtained by leaving the print head 35 to stand for several days in a state in which a cap (not illustrated) is not mounted, drying and thickening the ink in the vicinity of the nozzle 651 to fix the ink, and measuring the residual vibration of the vibrating plate 621 in a state in which the ink cannot be ejected. As illustrated in FIGS. 13 and 17, when the ink in the vicinity of the nozzle 651 is fixed due to drying, the frequency is extremely low as compared with a case where the ink is normally ejected, and a characteristic waveform of the residual vibration Vout, in which the residual vibration Vout is over-attenuated, is thus obtained. That is, the frequency and phase of the residual vibration Vout when the ejection abnormality caused by the dry thickening has occurred in the ejection section 600 change with respect to the residual vibration Vout when the ejection section 600 is normal.

Figure 18:
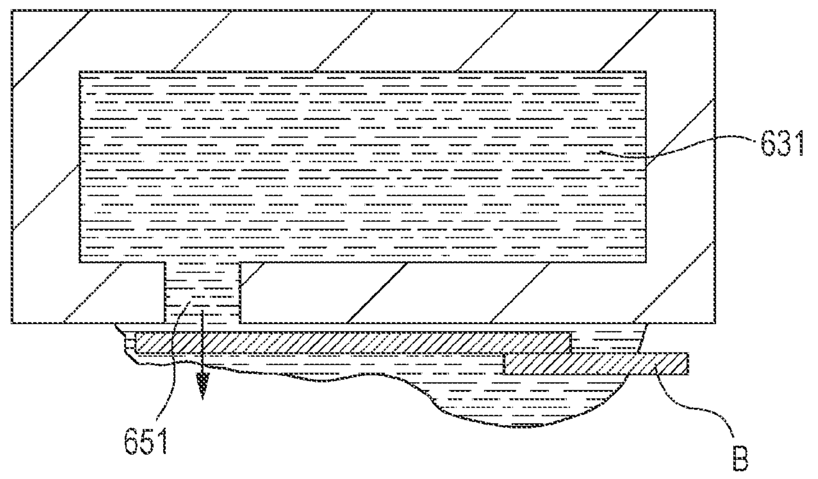
FIG. 18 is a view conceptually illustrating the vicinity of a nozzle when paper dust adhesion has occurred.

Next, the paper dust adhesion, which is still another cause of the ejection abnormality, will be examined. FIG. 18 is a view conceptually illustrating the vicinity of the nozzle 651 when the paper dust adhesion has occurred. As illustrated in FIG. 18, when paper dust B adheres to the vicinity of the nozzle 651, the ink seeps out from the inside of the cavity 631 through the paper dust B, and the ink is hardly ejected from the nozzle 651. As a result, when the paper dust B adheres to the vicinity of an outlet where the ink is ejected from the nozzle 651, which is the vicinity of the nozzle 651, more ink than usual is stored in the ejection section 600, and it is considered that the inertance m is increased. Furthermore, it is considered that the acoustic resistance r is also increased by the paper dust B adhered to the vicinity of the outlet of the nozzle 651. Therefore, when a calculation based on the calculation model in which the inertance m and the acoustic resistance r are set to be large is performed on the calculation value when the ink is normally ejected as illustrated in FIG. 13, a result as in FIG. 19, in which the calculation value obtained by the calculation and the experimental value of the residual vibration Vout when the paper dust adhesion has occurred in the vicinity of the nozzle 651 almost match, is obtained.

Figure 19:
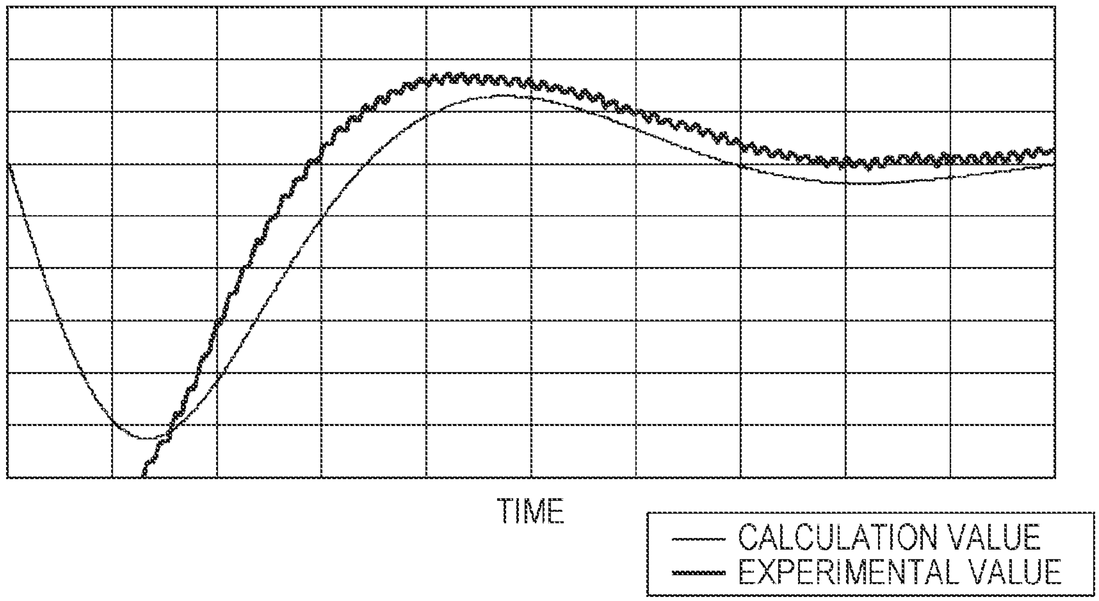
FIG. 19 is a diagram illustrating a relationship between an experimental value and a calculation value of residual vibration generated in the vibrating plate when paper dust adhesion has occurred.

FIG. 19 is a diagram illustrating a relationship between an experimental value and a calculation value of the residual vibration Vout generated in the vibrating plate 621 when the paper dust adhesion occurs. As illustrated in FIGS. 13 and 19, when the paper dust B adheres to the vicinity of the outlet of the nozzle 651, a characteristic waveform of the residual vibration Vout having a lower frequency than when the ink is normally ejected is obtained. That is, the frequency of the residual vibration Vout when the ejection abnormality caused by the paper dust adhesion has occurred in the ejection section 600 changes with respect to the residual vibration Vout when the ejection section 600 is normal. Here, comparing the frequency of the residual vibration Vout when the dry thickening has occurred in the ejection section 600 illustrated in FIG. 17 with the frequency of the residual vibration Vout when the paper dust adhesion has occurred in the ejection section 600 illustrated in FIG. 19, in both cases, the frequency of the attenuating vibration is low as compared with a case where the ink is normally ejected. However, it can be seen that the frequency of the residual vibration Vout when the paper dust adhesion occurs is higher than the frequency of the residual vibration Vout when the dry thickening occurs. That is, whether the cause of the ejection abnormality is the paper dust adhesion or dry thickening can be estimated based on the frequency of the residual vibration Vout.

As described above, whether or not an ejection abnormality has occurred in the ejection section 600 and the cause of the ejection abnormality in the ejection section 600 can be specified based on the frequency, period, and phase of the residual vibration Vout generated in the vibrating plate 621.

The residual vibration determination circuit 110 determines whether or not the ejection abnormality occurs in the ejection section 600 based on the frequency, period, and phase of the residual vibration Vout calculated based on the residual vibration signal NVT according to the residual vibration Vout. When the ejection abnormality has occurred in the ejection section 600, the residual vibration determination circuit 110 estimates whether the cause of the ejection abnormality is the bubble mixing, the dry thickening, or the paper dust adhesion. Then, the residual vibration determination circuit 110 generates the determination result whether or not the ejection abnormality occurs in the ejection section 600 and the determination result signal Rs indicating the cause of the ejection abnormality, and outputs the determination result signal Rs to the control circuit 100.

As described above, in the liquid ejecting apparatus 1 of the present embodiment, the detection circuit 52 detects a state of the ejection section 600 based on the residual vibration Vout generated in the ejection section 600 after the drive signal Vin is supplied to the piezoelectric element 60, and the residual vibration determination circuit 110 determines whether or not the ejection section 600 has an abnormality based on the residual vibration signal NVT indicating the detection result of the state of the ejection section 600 output by the detection circuit 52.

The control circuit 100 generates the memory control signal Mc for recording information indicating whether or not the abnormality occurs in the ejection section 600, propagated by the input determination result signal Rs, and the cause of the ejection abnormality to the recording circuit 120, and outputs the memory control signal Mc to the recording circuit 120. As a result, information on whether or not the ejection abnormality corresponding to each of the M ejection sections 600 has occurred, and the cause of the ejection abnormality are recorded in the recording circuit 120. The control circuit 100 can appropriately read out the information on whether or not the ejection abnormality has occurred in the ejection section 600 recorded in the recording circuit 120 as reading information Rd, thereby driving the print head 35 based on the latest information.

As a result, the control circuit 100 can execute complement processing on the ejection section 600 in which the ejection abnormality has occurred, and can stop the complement processing on the ejection section 600 recovered from the ejection abnormality. As a result, even when the ejection abnormality has occurred in any of the M ejection sections 600, a possibility that a quality of the image formed on the medium P is deteriorated is reduced, and when the ejection section 600 in which the ejection abnormality has occurred is recovered by the maintenance processing or the like, the complement processing can be stopped, thereby improving the quality of the image formed on the medium P.

Here, the detection circuit 52 that detects the residual vibration Vout indicating a state of the ejection section 600 is an example of a state detection section, the residual vibration determination circuit 110 that determines whether or not the ejection section 600 has an abnormality based on the residual vibration signal NVT based on the residual vibration Vout, as the detection result of the state of the ejection section 600 output by the detection circuit 52, is an example of a determination section, and the recording circuit 120 that records the information whether or not the ejection abnormality, included in the determination result signal Rs indicating the determination result of the residual vibration determination circuit 110, occurs in the ejection section 600 is an example of a recording section.

Here, in the liquid ejecting apparatus 1 of the present embodiment, determination is made whether or not the ejection abnormality occurs in the ejection section 600 based on the residual vibration Vout generated after the drive signal Vin is supplied to the piezoelectric element 60.

However, a method of determining whether or not the ejection abnormality occurs in the ejection section 600 is not limited to a method using the residual vibration Vout. As the method of determining whether or not the ejection abnormality occurs in the ejection section 600, various known methods, such as a so-called reflective type optical method of checking a difference in density of patterns formed on the medium P with an optical sensor and specifying a nozzle in which the ejection abnormality has occurred based on the checked result, and a so-called transmissive type optical method of irradiating ink droplets transmitted between an light emitting section and the light receiving section facing each other with light and specifying a nozzle in which the ejection abnormality has occurred based on change in light intensity when the ink droplets pass, can be provided.

However, when the reflective type optical method or the transmissive type optical method is used, it is necessary to provide a component such as a dedicated sensor, and therefore, there is a concern that the liquid ejecting apparatus 1 becomes large. To solve such a problem, in the method of determining whether or not the ejection abnormality occurs in the ejection section 600 based on the residual vibration Vout as in the present embodiment, a new component such as a dedicated sensor need not be added to the liquid ejecting apparatus 1. Therefore, a possibility that the liquid ejecting apparatus 1 becomes large is reduced, and furthermore, a state of the ejection section 600 can be detected in each unit operation period Tu corresponding to an ejection period at which the ejection section 600 ejects the ink to the medium P, and an advantageous effect capable of shortening an inspection period is provided.

6. Temperature of Ejection Section and Operation of Control Circuit

In the liquid ejecting apparatus 1 configured as described above, the control circuit 100 changes a control state of the print head 35 based on the temperature information signal TH output by the temperature detection circuit 250 included in the integrated circuit 200. Specifically, the control circuit 100 determines whether or not the temperature defined by the temperature information signal TH is within an ejection temperature range in which the ink can be ejected, and determines whether or not the temperature defined by the temperature information signal TH is within an inspection temperature range in which inspection on whether or not the ejection abnormality occurs in the ejection section 600 is made. Then, the control circuit 100 controls the operation of the print head 35 to limit the ejection of ink from the ejection section 600 according to whether or not the temperature defined by the temperature information signal TH is within the ejection temperature range. Alternatively, the inspection on whether or not the ejection abnormality occurs in the ejection section 600 is limited to be executed according to whether or not the temperature defined by the temperature information signal TH is within the inspection temperature range. That is, the ejection temperature range corresponds to a temperature range in which the ink is ejected from the print head 35, and the inspection temperature range corresponds to a temperature range in which the inspection on the ink ejection state from the ejection section 600 is executed.

First, an operation of the control circuit 100 based on whether or not the temperature defined by the temperature information signal TH is within the ejection temperature range will be described. The control circuit 100 determines whether or not the temperature defined by the temperature information signal TH input from the integrated circuit 200 is within the ejection temperature range. Then, when the control circuit 100 determines that the temperature defined by the temperature information signal TH is within the ejection temperature range, the control circuit 100 determines that the temperatures of the print head 35 and the ejection section 600 are within the temperature range in which the ink can be ejected normally, and controls the print head 35 to eject the ink from the ejection section 600. Specifically, when the temperature based on the input temperature information signal TH is within the ejection temperature range, the control circuit 100 generates the clock signal SCK, the print data signal SI, the latch signal LAT, the change signal CH, and the switching control signal Sw in order to control the operation of the print head 35, and outputs the clock signal SCK, the print data signal SI, the latch signal LAT, the change signal CH, and the switching control signal Sw to the print head 35. As a result, a predetermined amount of ink is ejected from the ejection section 600 included in the print head 35.

On the other hand, when the control circuit 100 determines that the temperature defined by the temperature information signal TH is not within the ejection temperature range, the control circuit 100 determines that the temperatures of the print head 35 and the ejection section 600 is in a temperature range in which the ink is difficult to eject normally, and controls the print head 35 not to eject the ink from the ejection section 600. Specifically, when the temperature based on the input temperature information signal TH is not within the ejection temperature range, the control circuit 100 stops to supply at least one of the clock signal SCK, the print data signal SI, the latch signal LAT, and the change signal CH to the print head 35. Accordingly, the supply of the drive signal Vin to the piezoelectric element 60 included in the ejection section 600 is stopped. As a result, the ink is not ejected from the ejection section 600 included in the print head 35.

When the temperature is not within the ejection temperature range, an ejection accuracy of the ink in the print head 35 and the ejection section 600 may be lowered due to temperature characteristics of parts constituting the print head 35 and the ejection section 600, or temperature change in physical properties of the ink stored in the print head 35 and the ejection section 600. When the ejection accuracy of the ink ejected from the ejection section 600 is lowered, the quality of the image formed on the medium P also deteriorates, and as a result, a problem that the image quality in the liquid ejecting apparatus 1 may not satisfy an image quality required by a user.

To solve such a problem, the control circuit 100 changes control conditions of the print head 35 based on the temperature information signal TH according to the temperatures of the print head 35 and the ejection section 600, or partially limits the driving of the print head 35. Thus, the possibility that the quality of the image formed on the medium P is deteriorated is reduced due to the temperature characteristics of parts constituting the print head 35 and the ejection section 600, or the temperature change in physical properties of the ink stored in the print head 35 and the ejection section 600.

Here, the ejection temperature range is a temperature range in which the liquid ejecting apparatus 1 can operate safely and normally, and specifically, is a temperature range in which the quality of the image formed on the medium P can satisfy the quality required by the user. Such an ejection temperature range may be referred to as, for example, an operation guaranteed temperature range or an operating temperature range.

Next, the inspection temperature range will be described. The inspection temperature range is a temperature range in which the inspection on an ejection state of the ink from the ejection section 600 can be executed in the liquid ejecting apparatus 1. When the temperature defined by the temperature information signal TH is within the inspection temperature range, the control circuit 100 can execute the inspection on the ejection state of the ejection section 600, and when the temperature defined by the temperature information signal TH is not within the inspection temperature range, the control circuit 100 does not execute the inspection on the ejection state of the ejection section 600.

Specifically, when the temperature based on the temperature information signal TH is within the inspection temperature range, if the determination result signal Rs is input from the residual vibration determination circuit 110, the control circuit 100 records a state of the ejection section 600 defined by the determination result signal Rs in the recording circuit 120. Then, the control circuit 100 controls the operation of the print head 35 based on the input determination result signal Rs and information indicating the state of the ejection section 600 recorded in the recording circuit 120.

On the other hand, when the temperature based on the temperature information signal TH is not within the inspection temperature range, the control circuit 100 controls the operation of the print head 35 based on the information indicating the state of the ejection section 600 recorded in the recording circuit 120 without depending on the input determination result signal Rs, even when the determination result signal Rs is input from the residual vibration determination circuit 110.

When the temperature is not within the inspection temperature range, a waveform of the residual vibration Vout is changed due to the temperature characteristics of parts constituting the print head 35 and the ejection section 600, or the temperature change in physical properties of the ink stored in the print head 35 and the ejection section 600. Due to such a change in the waveform of the residual vibration Vout, the residual vibration determination circuit 110 may erroneously determine that the ejection abnormality has occurred in the ejection section 600 even though the ejection section 600 does not have an abnormality, and erroneously determine that the ejection abnormality has not occurred in the ejection section 600 even though the ejection section 600 has an abnormality. That is, when the residual vibration determination circuit 110 detects the state of the ejection section 600 based on the residual vibration Vout generated when the temperature is not within the inspection temperature range, the state of the ejection section 600 may be erroneously determined.

When an erroneous determination is made that the ejection section 600 in which the ink can be normally ejected is the ejection section 600 in which the ejection abnormality has occurred due to such an erroneous determination in the residual vibration determination circuit 110, the quality of the image formed on the medium P deteriorates as compared with the image that can be formed on the medium P. Further, when an erroneous determination is made that the ejection section 600 in which the ink cannot be normally ejected is the ejection section 600 in which the ejection abnormality has not occurred, processing such as image complement cannot be executed on pixels corresponding to the ejection section 600 in which the ejection abnormality has occurred, and as a result, the quality of the image formed on the medium P deteriorates.

That is, the inspection temperature range corresponds to a temperature range in which the state of the ejection section 600 can be accurately detected, and determination is made whether or not the ejection section 600 has an abnormality in a predetermined inspection temperature range, and thus, a possibility that the residual vibration determination circuit 110 erroneously determines actual state of the ejection section 600 is reduced. As a result, the control circuit 100 can drive the print head 35 under the optimum conditions according to the state of the ejection section 600, and the possibility that the quality of the image formed on the medium P is deteriorated is reduced.

Here, at least a part of the inspection temperature range is a range overlapping at least a part of the ejection temperature range, which is preferable. Furthermore, the entire inspection temperature range is included in the ejection temperature range, which is more preferable. As a result, the printing processing in which the ejection section 600 ejects the ink to the medium P and the detection of whether or not the ejection section 600 has an abnormality can be performed in parallel. That is, it is not necessary to specify an individual operating state for inspecting the state of the ejection section 600, and the printing processing can be speeded up.

Here, in the following description, when the temperature based on the temperature information signal TH is within the inspection temperature range, the control circuit 100 records, in the recording circuit 120, information according to the determination result signal Rs input from the residual vibration determination circuit 110, and controls the operation of the print head 35 based on the determination result signal Rs and the information recorded in the recording circuit 120. When the temperature based on the temperature information signal TH is not within the inspection temperature range, it is described that the control circuit 100 controls the operation of the print head 35 based on the information recorded in the recording circuit 120 without depending on the determination result signal Rs input from the residual vibration determination circuit 110. However, when the temperature based on the temperature information signal TH is within the inspection temperature range, the detection circuit 52 may output the residual vibration signal NVT according to the residual vibration Vout to the residual vibration determination circuit 110, and when the temperature based on the temperature information signal TH is not within the inspection temperature range, the detection circuit 52 may not generate the residual vibration signal NVT according to the residual vibration Vout. That is, the detection circuit 52 may not detect the state of the ejection section 600 when the temperature detected by the temperature detection circuit 250 is out of the inspection temperature range. Even in this case, it is possible to obtain the operational effect as that to be described later.

When the temperature based on the temperature information signal TH is within the inspection temperature range, the residual vibration determination circuit 110 may output the determination result signal Rs based on the residual vibration signal NVT output by the detection circuit 52 to the control circuit 100, and when the temperature based on the temperature information signal TH is not within the inspection temperature range, the residual vibration determination circuit 110 may not output the determination result signal Rs to the control circuit 100. That is, the residual vibration determination circuit 110 may not determine whether or not the ejection section 600 has an abnormality when the temperature detected by the temperature detection circuit 250 is out of the inspection temperature range. Even in this case, it is possible to obtain the operational effect as that to be described later.

As described above, in the liquid ejecting apparatus 1 of the present embodiment, when the temperature based on the temperature information signal TH is within the inspection temperature range, the state of the ejection section 600 based on the residual vibration Vout is detected, and when the temperature based on the temperature information signal TH is not within the inspection temperature range, the state of the ejection section 600 based on the residual vibration Vout is not detected. Therefore, when the temperature based on the temperature information signal TH is within the inspection temperature range, the information indicating the state of the ejection section 600 recorded in the recording circuit 120 is updated, and a condition of updating the information varies depending on whether or not the temperature based on the temperature information signal TH is within the inspection temperature range or is not within the inspection temperature range.

Therefore, when the temperature based on the temperature information signal TH input to the control circuit 100 is within the inspection temperature range and when the temperature based on the temperature information signal TH is within the inspection temperature range is not within the inspection temperature range, respectively, the update condition of ejection section state information recorded in the recording circuit 120 will be described with reference to FIGS. 20 and 21. In the following description, the information indicating the state of the ejection section 600 recorded in the recording circuit 120 is referred to as ejection section state information.

FIG. 20 is a diagram illustrating an example of update conditions of ejection section state information when the temperature is within the inspection temperature range based on the temperature information signal TH. Here, when the liquid ejecting apparatus 1 has never perform the ejection operation of the ink, it is estimated that the ejection section 600 is normal. That is, information that the nozzle 651 corresponding to the ejection section 600 is a normal nozzle is recorded in the recording circuit 120 as an initial state of the ejection section state information.

First, a case will be described in which the recording circuit 120 records the ejection section state information that the corresponding nozzle 651 is a normal nozzle because the ejection abnormality has not occurred in the ejection section 600 before performing an event in which the ejection section state information recorded in the recording circuit 120 can be updated.

As illustrated in FIG. 20, when the recording circuit 120 records the ejection section state information that the nozzle 651 corresponding to the ejection section 600 is a normal nozzle, the control circuit 100 performs a state detection event of the ejection section 600 based on the residual vibration Vout, and when the residual vibration determination circuit 110 determines that the ejection abnormality has not occurred in the corresponding ejection section 600, the control circuit 100 determines that the nozzle 651 included in the corresponding ejection section 600 is in a normal state. Then, the control circuit 100 causes the recording circuit 120 to record the ejection section state information that the nozzle 651 included in the corresponding ejection section 600 is a normal nozzle, as recording information after the state detection event is performed.

When the recording circuit 120 records the ejection section state information that the nozzle 651 corresponding to the ejection section 600 is a normal nozzle, the control circuit 100 performs a state detection event of the ejection section 600 based on the residual vibration Vout, and when the residual vibration determination circuit 110 determines that the ejection abnormality has occurred in the corresponding ejection section 600, the control circuit 100 determines that the nozzle 651 included in the corresponding ejection section 600 has an abnormality. Then, the control circuit 100 causes the recording circuit 120 to record the ejection section state information that the nozzle 651 included in the corresponding ejection section 600 is an abnormal nozzle, as recording information after the state detection event is performed.

In a case in which the recording circuit 120 records the ejection section state information that the nozzle 651 corresponding to the ejection section 600 is a normal nozzle, when the control circuit 100 performs an event in which the maintenance processing is executed on the corresponding ejection section 600, the control circuit 100 estimates that the nozzle 651 included in the corresponding ejection section 600 is in a normal state. Then, the control circuit 100 causes the recording circuit 120 to record the ejection section state information that the nozzle 651 included in the corresponding ejection section 600 is a normal nozzle, as recording information after the event of the maintenance processing is performed.

Next, a case will be described in which the recording circuit 120 records the ejection section state information that the corresponding nozzle 651 is an abnormal nozzle because the ejection abnormality has occurred in the ejection section 600 before performing an event in which the ejection section state information recorded in the recording circuit 120 can be updated.

As illustrated in FIG. 20, when the recording circuit 120 records the ejection section state information that the nozzle 651 corresponding to the ejection section 600 is an abnormal nozzle, the control circuit 100 performs a state detection event of the ejection section 600 based on the residual vibration Vout, and when the residual vibration determination circuit 110 determines that the ejection abnormality has not occurred in the corresponding ejection section 600, the control circuit 100 determines that the nozzle 651 included in the corresponding ejection section 600 is recovered from the ejection abnormality. Then, the control circuit 100 causes the recording circuit 120 to record the ejection section state information that the nozzle 651 included in the corresponding ejection section 600 is a normal nozzle, as recording information after the state detection event is performed.

When the recording circuit 120 records the ejection section state information that the nozzle 651 corresponding to the ejection section 600 is an abnormal nozzle, the control circuit 100 performs a state detection event of the ejection section 600 based on the residual vibration Vout, and when the residual vibration determination circuit 110 determines that the ejection abnormality has occurred in the corresponding ejection section 600, the control circuit 100 determines that the ejection abnormality occurred in the corresponding ejection section 600 continues. Then, the control circuit 100 causes the recording circuit 120 to record the ejection section state information that the nozzle 651 included in the corresponding ejection section 600 is an abnormal nozzle, as recording information after the state detection event is performed.

In a case in which the recording circuit 120 records the ejection section state information that the nozzle 651 corresponding to the ejection section 600 is an abnormal nozzle, when the control circuit 100 performs an event in which the maintenance processing is executed on the corresponding ejection section 600, the control circuit 100 estimates that the nozzle 651 included in the ejection section 600 has been recovered from the ejection abnormality. Then, the control circuit 100 causes the recording circuit 120 to record the ejection section state information that the nozzle 651 included in the corresponding ejection section 600 is a nozzle subjected to recovery processing, as recording information after an event of the maintenance processing is performed.

Next, a case will be described in which the recording circuit 120 records the ejection section state information that the nozzle 651 corresponding to the ejection section 600 is a nozzle subjected to the recovery processing, before performing an event in which the ejection section state information recorded in the recording circuit 120 can be updated.

As illustrated in FIG. 20, when the recording circuit 120 records the ejection section state information that the nozzle 651 corresponding to the ejection section 600 is a nozzle subjected to the recovery processing, the control circuit 100 performs a state detection event of the ejection section 600 based on the residual vibration Vout, and when the residual vibration determination circuit 110 determines that the ejection abnormality has not occurred in the corresponding ejection section 600, the control circuit 100 determines that the nozzle 651 included in the corresponding ejection section 600 is recovered from the ejection abnormality by the maintenance processing. Then, the control circuit 100 causes the recording circuit 120 to record the ejection section state information that the nozzle 651 included in the corresponding ejection section 600 is a normal nozzle, as recording information after the state detection event is performed.

When the recording circuit 120 records the ejection section state information that the nozzle 651 corresponding to the ejection section 600 is a nozzle subjected to the recovery processing, the control circuit 100 performs a state detection event of the ejection section 600 based on the residual vibration Vout, and when the residual vibration determination circuit 110 determines that the ejection abnormality has occurred in the corresponding ejection section 600, the control circuit 100 determines that the abnormality occurred in the ejection section 600 means that the failure which is difficult to recover by the maintenance processing occurs by the maintenance unit 90. Then, the control circuit 100 causes the recording circuit 120 to record the ejection section state information that the nozzle 651 included in the corresponding ejection section 600 is a failed nozzle, as recording information after the state detection event is performed. Here, the control circuit 100 determines that the nozzle 651 in which the ejection abnormality has occurred is a failed nozzle when the ejection abnormality is not resolved even if the maintenance processing is executed on the nozzle 651 in plural times, and the ejection section state information that the nozzle 651 included in the corresponding ejection section 600 is a failed nozzle may be recorded in the recording circuit 120.

In a case in which the recording circuit 120 records the ejection section state information that the nozzle 651 corresponding to the ejection section 600 is a nozzle subjected to the recovery processing, when the control circuit 100 performs an event in which the maintenance processing is executed on the corresponding ejection section 600, the control circuit 100 determines that the nozzle 651 included in the corresponding ejection section 600 is a nozzle that continues to be subjected to the recovery processing. Then, the control circuit 100 causes the recording circuit 120 to record the ejection section state information that the nozzle 651 included in the corresponding ejection section 600 is a nozzle subjected to recovery processing, as recording information after an event of the maintenance processing is performed.

Next, a case will be described in which the recording circuit 120 records the ejection section state information that the nozzle 651 corresponding to the ejection section 600 is a failed nozzle, before performing an event in which the ejection section state information recorded in the recording circuit 120 can be updated.

As illustrated in FIG. 20, when the recording circuit 120 records the ejection section state information that the nozzle 651 corresponding to the ejection section 600 is a failed nozzle, the control circuit 100 performs a state detection event of the ejection section 600 based on the residual vibration Vout, and when the residual vibration determination circuit 110 determines that the ejection abnormality has not occurred in the corresponding ejection section 600, the control circuit 100 determines that the failure of the nozzle 651 included in the corresponding ejection section 600 has been improved. Then, the control circuit 100 causes the recording circuit 120 to record the ejection section state information that the nozzle 651 included in the corresponding ejection section 600 is a normal nozzle, as recording information after the state detection event is performed. Here, when it is determined that the nozzle 651 determined to be failed is a normal nozzle in plural times, the control circuit 100 causes the recording circuit 120 to record the ejection section state information that the nozzle 651 included in the corresponding ejection section 600 is a normal nozzle.

When the recording circuit 120 records the ejection section state information that the nozzle 651 corresponding to the ejection section 600 is a failed nozzle, the control circuit 100 performs a state detection event of the ejection section 600 based on the residual vibration Vout, and when the residual vibration determination circuit 110 determines that the ejection abnormality has occurred in the corresponding ejection section 600, the control circuit 100 determines that the ejection section 600 is continuously in a failed state. Then, the control circuit 100 causes the recording circuit 120 to record the ejection section state information that the nozzle 651 included in the corresponding ejection section 600 is a failed nozzle, as recording information after the state detection event is performed.

In a case in which the recording circuit 120 records the ejection section state information that the nozzle 651 corresponding to the ejection section 600 is a failed nozzle, when the control circuit 100 performs an event in which the maintenance processing is executed on the corresponding ejection section 600, the control circuit 100 determines that the ejection section 600 is continuously in the failed state. Then, the control circuit 100 causes the recording circuit 120 to record the ejection section state information that the nozzle 651 included in the corresponding ejection section 600 is a failed nozzle, as recording information after the event of the maintenance processing is performed.

Next, when the temperature based on the temperature information signal TH input to the control circuit 100 is not within the inspection temperature range, the update condition of ejection section state information recorded in the recording circuit 120 will be described with reference to FIG. 21. FIG. 21 is a diagram illustrating an example of update conditions of ejection section state information when the temperature is not within the inspection temperature range based on the temperature information signal TH.

First, a case will be described in which the recording circuit 120 records the ejection section state information that the corresponding nozzle 651 is a normal nozzle because the ejection abnormality has not occurred in the ejection section 600 before performing an event in which the ejection section state information recorded in the recording circuit 120 can be updated.

As illustrated in FIG. 21, when the recording circuit 120 records the ejection section state information that the nozzle 651 corresponding to the ejection section 600 is a normal nozzle, the control circuit 100 performs a state detection event of the ejection section 600 based on the residual vibration Vout. In both cases where the residual vibration determination circuit 110 determines that the ejection abnormality has not occurred in the corresponding ejection section 600 and where the residual vibration determination circuit 110 determines that the ejection abnormality has occurred in the corresponding ejection section 600, the control circuit 100 determines that the ejection abnormality has not occurred in the corresponding ejection section 600 without depending on the determination result in the residual vibration determination circuit 110. That is, when the temperature information signal TH is out of the inspection temperature range, the control circuit 100 does not update the ejection section state information recorded in the recording circuit 120 without depending on the state detection result of the ejection section 600 based on the residual vibration Vout.

In a case in which the recording circuit 120 records the ejection section state information that the nozzle 651 corresponding to the ejection section 600 is a normal nozzle, when the control circuit 100 performs an event in which the maintenance processing is executed on the corresponding ejection section 600, the control circuit 100 estimates that the nozzle 651 included in the corresponding ejection section 600 is in a normal state. Then, the control circuit 100 causes the recording circuit 120 to record the ejection section state information that the nozzle 651 included in the corresponding ejection section 600 is a normal nozzle, as recording information after the event of the maintenance processing is performed.

Next, a case will be described in which the recording circuit 120 records the ejection section state information that the corresponding nozzle 651 is an abnormal nozzle because the ejection abnormality has occurred in the ejection section 600 before performing an event in which the ejection section state information recorded in the recording circuit 120 can be updated.

As illustrated in FIG. 21, when the recording circuit 120 records the ejection section state information that the nozzle 651 corresponding to the ejection section 600 is an abnormal nozzle, the control circuit 100 performs a state detection event of the ejection section 600 based on the residual vibration Vout. In both cases where the residual vibration determination circuit 110 determines that the ejection abnormality has not occurred in the corresponding ejection section 600 and where the residual vibration determination circuit 110 determines that the ejection abnormality has occurred in the corresponding ejection section 600, the control circuit 100 determines that the ejection abnormality has occurred in the corresponding ejection section 600 without depending on the determination result in the residual vibration determination circuit 110. That is, when the temperature information signal TH is out of the inspection temperature range, the control circuit 100 does not update the ejection section state information recorded in the recording circuit 120 without depending on the state detection result of the ejection section 600 based on the residual vibration Vout.

In a case in which the recording circuit 120 records the ejection section state information that the nozzle 651 corresponding to the ejection section 600 is an abnormal nozzle, when the control circuit 100 performs an event in which the maintenance processing is executed on the corresponding ejection section 600, the control circuit 100 estimates that the nozzle 651 included in the corresponding ejection section 600 has been recovered from the ejection abnormality. Then, the control circuit 100 causes the recording circuit 120 to record the ejection section state information that the nozzle 651 included in the corresponding ejection section 600 is a normal nozzle, as recording information after the event of the maintenance processing is performed.

That is, when the recording circuit 120 records abnormality information indicating that the ejection abnormality has occurred in the ejection section 600 as a determination result by determining that the abnormality has occurred in the ejection section 600 by the residual vibration determination circuit 110, and the temperature detection circuit 250 detects the temperature that is out of the inspection temperature range in which the detection circuit 52 detects the state of the ejection section 600, if the maintenance unit 90 executes the maintenance processing, information on the abnormal nozzle indicating that the ejection abnormality has occurred in the ejection section 600 recorded in the recording circuit 120 is reset to information indicating a normal nozzle, in which the ejection abnormality has not occurred in the ejection section 600, as the initial state.

Next, a case will be described in which the recording circuit 120 records the ejection section state information that the nozzle 651 corresponding to the ejection section 600 is a nozzle subjected to the recovery processing, before performing an event in which the ejection section state information recorded in the recording circuit 120 can be updated.

As illustrated in FIG. 21, when the recording circuit 120 records the ejection section state information that the nozzle 651 corresponding to the ejection section 600 is a nozzle subjected to the recovery processing, the control circuit 100 performs a state detection event of the ejection section 600 based on the residual vibration Vout. In both cases where the residual vibration determination circuit 110 determines that the ejection abnormality has not occurred in the corresponding ejection section 600 and where the residual vibration determination circuit 110 determines that the ejection abnormality has occurred in the corresponding ejection section 600, the control circuit 100 determines that the nozzle 651 included in the corresponding ejection section 600 is a nozzle subjected to the recovery processing without depending on the determination result in the residual vibration determination circuit 110. That is, when the temperature information signal TH is out of the inspection temperature range, the control circuit 100 does not update the ejection section state information recorded in the recording circuit 120 without depending on the state detection result of the ejection section 600 based on the residual vibration Vout.

In a case in which the recording circuit 120 records the ejection section state information that the nozzle 651 corresponding to the ejection section 600 is a nozzle subjected to the recovery processing, when the control circuit 100 performs an event in which the maintenance processing is executed on the corresponding ejection section 600, the control circuit 100 estimates that the nozzle 651 included in the corresponding ejection section 600 is a normal nozzle in which the ejection abnormality has not occurred. Then, the control circuit 100 causes the recording circuit 120 to record the ejection section state information that the nozzle 651 included in the corresponding ejection section 600 is a normal nozzle, as recording information after the event of the maintenance processing is performed.

Next, a case will be described in which the recording circuit 120 records the ejection section state information that the nozzle 651 corresponding to the ejection section 600 is a failed nozzle, before performing an event in which the ejection section state information recorded in the recording circuit 120 can be updated.

As illustrated in FIG. 21, when the recording circuit 120 records the ejection section state information that the nozzle 651 corresponding to the ejection section 600 is a failed nozzle, the control circuit 100 performs a state detection event of the ejection section 600 based on the residual vibration Vout. In both cases where the residual vibration determination circuit 110 determines that the ejection abnormality has not occurred in the corresponding ejection section 600 and where the residual vibration determination circuit 110 determines that the ejection abnormality has occurred in the corresponding ejection section 600, the control circuit 100 determines that the failure occurs in the nozzle 651 included in the corresponding ejection section 600 without depending on the determination result in the residual vibration determination circuit 110. That is, when the temperature information signal TH is out of the inspection temperature range, the control circuit 100 does not update the ejection section state information recorded in the recording circuit 120 without depending on the state detection result of the ejection section 600 based on the residual vibration Vout.

In a case in which the recording circuit 120 records the ejection section state information that the nozzle 651 corresponding to the ejection section 600 is a failed nozzle, when the control circuit 100 performs an event in which the maintenance processing is executed on the corresponding ejection section 600, even if the control circuit 100 executes the maintenance processing on the corresponding ejection section 600, the failure is not improved, and thus, the control circuit 100 estimates that the nozzle 651 included in the corresponding ejection section 600 is a failed nozzle. Then, the control circuit 100 causes the recording circuit 120 to record the ejection section state information that the nozzle 651 included in the corresponding ejection section 600 is a failed nozzle, as recording information after the event of the maintenance processing is performed.

That is, when the recording circuit 120 records information indicating that the nozzle 651 included in the ejection section 600 is a failed nozzle, and when the temperature detection circuit 250 detects a temperature that is out of the inspection temperature range in which the detection circuit 52 detects the state of the ejection section 600, the information indicating a failed nozzle recorded in the recording circuit 120 is not reset even if the maintenance unit 90 executes the maintenance processing.

7. Operational Effect

As described above, in the liquid ejecting apparatus 1 of the present embodiment, when the temperature defined by the temperature information signal TH output by the temperature detection circuit 250 is within the inspection temperature range, the control circuit 100 causes the recording circuit 120 to record information whether the state of the ejection section 600 determined by the residual vibration determination circuit 110 is normal or abnormal based on the residual vibration Vout generated after the drive signal Vin is supplied to the piezoelectric element 60, and when the temperature defined by the temperature information signal TH output by the temperature detection circuit 250 is not within the inspection temperature range, the control circuit 100 causes the recording circuit 120 not to record information whether the ejection section 600 is normal or abnormal based on the residual vibration Vout. That is, when the temperature defined by the temperature information signal TH output by the temperature detection circuit 250 is not within the inspection temperature range, the control circuit 100 does not determine whether the ejection section 600 is normal or abnormal based on the residual vibration Vout.

As a result, since the temperature defined by the temperature information signal TH is not within the inspection temperature range, determination is made based on the residual vibration Vout having the lowered waveform accuracy, and a possibility that information on the erroneous state of the ejection section 600 is recorded in the recording circuit 120 is reduced. As a result, a possibility that the print head 35 is controlled based on the erroneous state of the ejection section 600 is reduced, and the possibility that the quality of the image formed on the medium P in the liquid ejecting apparatus 1 is deteriorated is reduced.

Furthermore, in the liquid ejecting apparatus 1 of the present embodiment, when the temperature defined by the temperature information signal TH output by the temperature detection circuit 250 is not within the inspection temperature range, and when the maintenance unit 90 executes the maintenance processing on the ejection section 600 determined that the ejection abnormality has occurred, the control circuit 100 updates the information indicating the state of the ejection section 600 recorded in the recording circuit 120 corresponding to the ejection section 600 on which the maintenance processing is executed as a normal nozzle capable of normally ejecting the ink. When the maintenance processing is executed on the ejection section 600 in which the ejection abnormality has occurred, the control circuit 100 can estimate that the corresponding ejection section 600 has been recovered from the state of the ejection abnormality through the maintenance processing. The information recorded in the recording circuit 120 corresponding to the ejection section 600 that can be estimated to be recovered from such an ejection abnormality is updated as a normal nozzle, such that the print head 35 can be controlled according to the estimated state of the ejection section 600 even when the temperature defined by the temperature information signal TH output by the temperature detection circuit 250 is not within the inspection temperature range in which the determination is not made whether the ejection section 600 is normal or abnormal based on the residual vibration Vout. As a result, the print head 35 can be controlled according to the estimated state of the ejection section 600 even when the temperature defined by the temperature information signal TH output by the temperature detection circuit 250 is not within the inspection temperature range, and a possibility that the quality of the image formed on the medium P in the liquid ejecting apparatus 1 is further reduced.

Furthermore, in the liquid ejecting apparatus 1 of the present embodiment, when the temperature defined by the temperature information signal TH output by the temperature detection circuit 250 is not within the inspection temperature range, and even if the maintenance unit 90 executes the maintenance processing on the ejection section 600 determined that the failure occurs, the information indicating the state of the ejection section 600 recorded in the recording circuit 120 corresponding to the ejection section 600 is not updated. That is, when the temperature defined by the temperature information signal TH output by the temperature detection circuit 250 is not within the inspection temperature range, and when the maintenance unit 90 executes the maintenance processing on the ejection section 600 determined that the failure occurs, the state of the ejection section 600 recorded in the recording circuit 120 corresponding to the ejection section 600 on which the maintenance processing is executed is not reset. The failed ejection section 600 is difficult to be recovered by performing the maintenance processing. Therefore, as the maintenance processing is executed on the ejection section 600 in which the failure occurs, it is estimated that the ejection section 600 continues the failed state and is not recovered to a normal state. The information recorded in the recording circuit 120 corresponding to the ejection section 600 that can be estimated to continue such a failed state, such that the print head 35 can be controlled according to the estimated state of the ejection section 600 even when the temperature defined by the temperature information signal TH output by the temperature detection circuit 250 is not within the inspection temperature range, and a possibility that the quality of the image formed on the medium P in the liquid ejecting apparatus 1 is deteriorated is further reduced.

The embodiment has been described above, but the present disclosure is not limited to the embodiments and the modification examples, and can be implemented in various aspects without departing from the gist thereof. For example, the above-described embodiment can be combined as appropriate.

The present disclosure includes substantially the same configurations (for example, configurations having the same functions, methods, and results, or configurations having the same objects and effects) as the configurations described in the embodiment. Further, the present disclosure includes configurations in which non-essential parts of the configuration described in the embodiment are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiment.

The following contents are derived from the above-described embodiment.

An aspect of a liquid ejecting apparatus includes an ejection section ejecting a liquid; a state detection section detecting a state of the ejection section; a determination section determining whether or not the ejection section has an abnormality based on a detection result of the state detection section; a recording section recording a determination result of the determination section; a temperature detection section detecting a temperature of the ejection section; and a maintenance section executing maintenance processing on the ejection section, in which when the recording section records abnormality information indicating the abnormality of the ejection section as the determination result by determining that the abnormality occurred in the ejection section by the determination section, and the temperature detection section detects a temperature that is out of an inspection temperature range in which the state detection section detects the state of the ejection section, the abnormality information recorded in the recording section is reset if the maintenance section executes the maintenance processing.

According to the liquid ejecting apparatus, when the recording section records the abnormality information indicating the abnormality of the ejection section as the determination result, even if the temperature detection section detects the temperature that is out of the inspection temperature range in which the state detection section detects the state of the ejection section, the abnormality information recorded in the recording section is reset when the maintenance section executes the maintenance processing. That is, since it is estimated that the ejection section is recovered from the abnormal state by executing the maintenance processing by the maintenance section, it can be determined that the ejection section is normal when the maintenance section executes the maintenance processing, even in a temperature range in which the state detection section cannot detect the state of the ejection section. As a result, when it is expected that the state of the ejection section in which the abnormality has occurred has been recovered out of the inspection temperature range in which the abnormality of the ejection section is detected, a possibility that the ejection section continuously is driven to be abnormal is reduced. As a result, the liquid according to the state of the ejection section can be ejected even out of the inspection temperature range in which the abnormality of the ejection section is detected, and thus, the possibility that the quality of the image formed on a medium is deteriorated is reduced.

In the aspect of the liquid ejecting apparatus, the ejection section may include a piezoelectric element that ejects the liquid by being driven, the state detection section may detect the state of the ejection section based on a residual vibration generated in the ejection section after the piezoelectric element is driven, and the determination section may determine whether or not the ejection section has the abnormality based on a residual vibration signal according to the residual vibration output by the state detection section.

According to the liquid ejecting apparatus, the state detection section detects the abnormality of the ejection section based on the residual vibration generated after the piezoelectric element included in the ejection section is driven, and the determination section determines whether or not the ejection section has the abnormality based on the residual vibration. Thus, a component for determining the state of the ejection section, such as a sensor, need not be included, and a possibility that the liquid ejecting apparatus becomes large is reduced.

In the aspect of the liquid ejecting apparatus, the maintenance processing may include a wiping process of wiping an ejection surface to which the liquid is ejected from the ejection section.

According to this liquid ejecting apparatus, the maintenance processing includes the wiping process, paper dust is wiped by the wiping process when the ejection abnormality has occurred due to adhesion of the paper dust to the ejection section. Therefore, the ejection section can be effectively recovered from the ejection abnormality.

In the aspect of the liquid ejecting apparatus, the maintenance processing may include a flushing process of recovering a viscosity of the liquid stored in the ejection section.

According to this liquid ejecting apparatus, the maintenance processing includes the flushing process, the viscosity of the liquid stored in the ejection section can be recovered by the flushing process even if the liquid in the vicinity of a nozzle of the ejection section is dried or thickened. Therefore, the ejection section can be effectively recovered from the ejection abnormality.

In the aspect of the liquid ejecting apparatus, in a case of a failed state in which failure occurs in the ejection section, when the recording section records the abnormality information, and when the temperature detection section detects the temperature that is out of the inspection temperature range in which the state detection section detects the state of the ejection section, the abnormality information recorded in the recording section may not be reset even if the maintenance section executes the maintenance processing.

When the failure occurs in the ejection section, it is difficult to recover by the maintenance processing, and it is thus estimated that the failed state of the ejection section is not resolved even if the maintenance processing is not executed on the ejection section in which the failure occurs.

That is, according to the liquid ejecting apparatus, a possibility of erroneously determining that the ejection section is normal is reduced, the ejection section being expected not to recover the abnormality even if the maintenance processing is executed. As a result, the possibility of erroneously determining that the ejection section is normal outside the inspection temperature range in which the abnormality of the ejection section is detected, is reduced. As a result, the liquid according to the state of the ejection section can be ejected even out of the inspection temperature range in which the abnormality of the ejection section is detected, and thus, the possibility that the quality of the image formed on a medium is deteriorated is reduced.

In the aspect of the liquid ejecting apparatus, the state detection section may not detect the state of the ejection section when the temperature detected by the temperature detection section is out of the inspection temperature range.

In the aspect of the liquid ejecting apparatus, the determination section may not determine whether or not the ejection section has the abnormality when the temperature detected by the temperature detection section is out of the inspection temperature range.

What is claimed is:

1. A liquid ejecting apparatus comprising:

an ejection section ejecting a liquid;

a state detection section detecting a state of the ejection section;

a determination section determining whether or not the ejection section has an abnormality based on a detection result of the state detection section;

a recording section recording a determination result of the determination section;

a temperature detection section detecting a temperature of the ejection section; and a maintenance section executing maintenance processing on the ejection section, wherein when the recording section records abnormality information indicating the abnormality of the ejection section as the determination result by determining that the abnormality occurred in the ejection section by the determination section, and the temperature detection section detects a temperature that is out of an inspection temperature range in which the state detection section detects the state of the ejection section, the abnormality information recorded in the recording section is reset to a normality information indicating that the ejection section does not have the abnormality if the maintenance section executes the maintenance processing, and when the recording section records the abnormality information as the determination result by determining that the abnormality occurred in the ejection section by the determination section, and the temperature detection section detects a temperature that is within the inspection temperature range, the abnormality information recorded in the recording section is updated to a recovery information indicating that the ejection section has been recovering from the abnormality if the maintenance section executes the maintenance processing, with the recovery information being different from the normality information.

2. The liquid ejecting apparatus according to claim 1, wherein the ejection section includes a piezoelectric element that ejects the liquid by being driven, the state detection section detects the state of the ejection section based on a residual vibration generated in the ejection section after the piezoelectric element is driven, and the determination section determines whether or not the ejection section has the abnormality based on a residual vibration signal according to the residual vibration output by the state detection section.

3. The liquid ejecting apparatus according to claim 1, wherein the maintenance processing includes a wiping process of wiping an ejection surface to which the liquid is ejected from the ejection section.

4. The liquid ejecting apparatus according to claim 1, wherein the maintenance processing includes a flushing process of recovering a viscosity of the liquid stored in the ejection section.

5. A liquid ejecting apparatus comprising:

an ejection section ejecting a liquid;

a state detection section detecting a state of the ejection section;

a determination section determining whether or not the ejection section has an abnormality based on a detection result of the state detection section;

a recording section recording a determination result of the determination section;

a temperature detection section detecting a temperature of the ejection section; and a maintenance section executing maintenance processing on the ejection section, wherein when the recording section records abnormality information indicating the abnormality of the ejection section as the determination result by determining that the abnormality occurred in the ejection section by the determination section, and the temperature detection section detects a temperature that is out of an inspection temperature range in which the state detection section detects the state of the ejection section, the abnormality information recorded in the recording section is reset if the maintenance section executes the maintenance processing, and in a case of a failed state in which failure occurs in the ejection section, when the recording section records the abnormality information, and the temperature detection section detects the temperature that is out of the inspection temperature range in which the state detection section detects the state of the ejection section, the abnormality information recorded in the recording section is not reset even if the maintenance section executes the maintenance processing.

6. The liquid ejecting apparatus according to claim 1, wherein the state detection section does not detect the state of the ejection section when the temperature detected by the temperature detection section is out of the inspection temperature range.

7. The liquid ejecting apparatus according to claim 1, wherein the determination section does not determine whether or not the ejection section has the abnormality when the temperature detected by the temperature detection section is out of the inspection temperature range.

* * * * *